United States Patent [19]
Nagata et al.

[11] Patent Number: 5,613,026
[45] Date of Patent: Mar. 18, 1997

[54] PACKAGE STRUCTURE FOR OPTICAL ELEMENT AND FIBERS AND COMPOSITE STRUCTURE THEREOF

[75] Inventors: Hirotoshi Nagata; Masaru Shiroishi; Tsutomu Saito; Takashi Tateyama; Mithuru Sakuma; Naoki Kougo; Susumu Murata; Ryosuke Kaizu; Nobuhide Miyamoto, all of Funabashi, Japan

[73] Assignee: Sumitomo Osaka Cement Co., Ltd., Tokyo, Japan

[21] Appl. No.: 362,190

[22] Filed: Dec. 22, 1994

[30]     Foreign Application Priority Data

| Dec. 28, 1993 | [JP] | Japan | 5-335291 |
| Dec. 28, 1993 | [JP] | Japan | 5-336102 |
| Mar. 30, 1994 | [JP] | Japan | 6-060750 |
| Apr. 14, 1994 | [JP] | Japan | 6-075798 |
| Apr. 15, 1994 | [JP] | Japan | 6-076928 |
| Apr. 28, 1994 | [JP] | Japan | 6-092147 |
| May 18, 1994  | [JP] | Japan | 6-103959 |

[51] Int. Cl.$^6$ ................................. G02B 6/36
[52] U.S. Cl. .................. 385/94; 385/88; 385/89; 385/90; 385/91; 385/92
[58] Field of Search ................. 385/88–94, 31, 385/32, 44, 50, 52, 95

[56]         References Cited

U.S. PATENT DOCUMENTS

| 4,880,290 | 11/1989 | Kumazawa et al. | 385/95 |
| 5,305,407 | 4/1994  | Monroe et al.   | 385/89 |
| 5,386,488 | 1/1995  | Oikawa          | 385/92 |
| 5,430,820 | 7/1995  | Van Tongeren et al. | 385/94 |
| 5,475,784 | 12/1995 | Bookbinder et al. | 385/94 |

FOREIGN PATENT DOCUMENTS

| 0241955    | 10/1987 | European Pat. Off. .   |        |
| 56-135801  | 10/1981 | Japan                  | 385/94 |
| 2091901    | 8/1982  | United Kingdom .       |        |
| 2148535    | 5/1985  | United Kingdom .       |        |
| 2217871    | 11/1989 | United Kingdom .       |        |
| 2264789    | 9/1993  | United Kingdom .       |        |
| WO89/06816 | 7/1989  | WIPO                   | 385/94 |

OTHER PUBLICATIONS

Practical method of waveguide–to–fiber connection: direct preparation of waveguide endface by cutting machine and reinforcement using ruby beads, by N. Mekada et al., published in Applied Optics, vol. 29, No. 34, on Dec. 1, 1990.

Input/output fiber configuration in a laser package design, by E. Suhir et al., published in Journal of Lightwave Technology, vol. 11, No. 12, Jan. 1993.

Japanese Patent Abstract Publication JP57133418, published Aug. 18, 1982 in the name of O. Haruo, et al.

Japanese Patent Abstract Publication 61-267386(A), published Nov. 26, 1986 in the name of M. Shimaoka.

Primary Examiner—Rodney B. Bovernick
Assistant Examiner—Hemang Sanghavi
Attorney, Agent, or Firm—Paul & Paul

[57]         ABSTRACT

An optical element-optical fiber composite structure having a high resistance of the optical fiber to breakage due to cyclical change in temperature, includes a package structure having a main container, side containers attached to the main container and sleeves through which a main chamber of the main container is connected to side chambers of the side containers; an optical element housed in the main chamber; and optical fibers introduced into the main chamber through the side chambers and the sleeves and connected to the optical element.

29 Claims, 21 Drawing Sheets

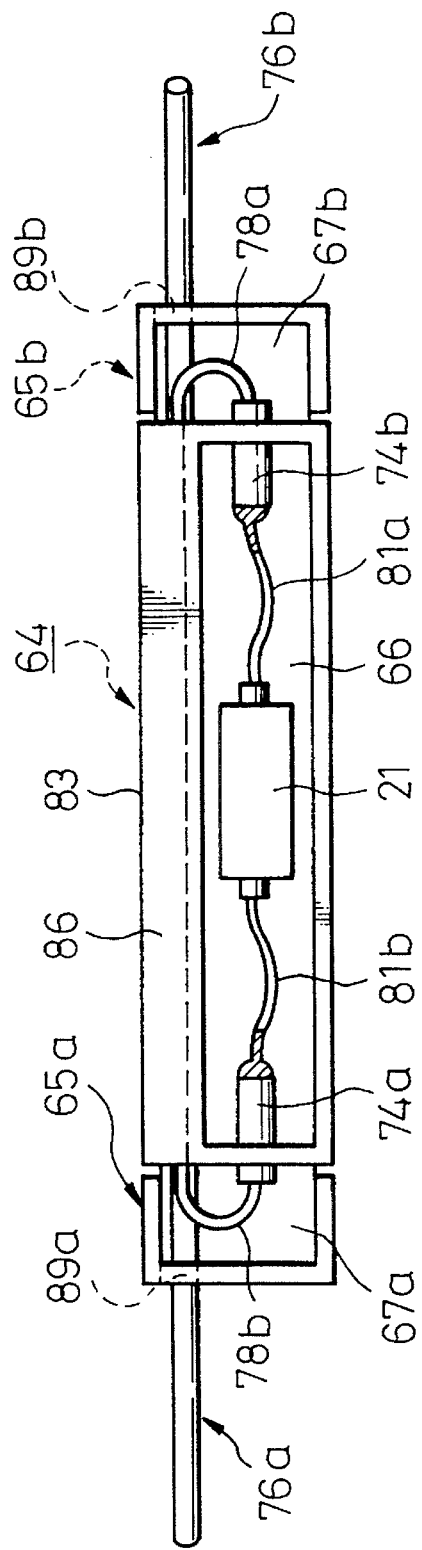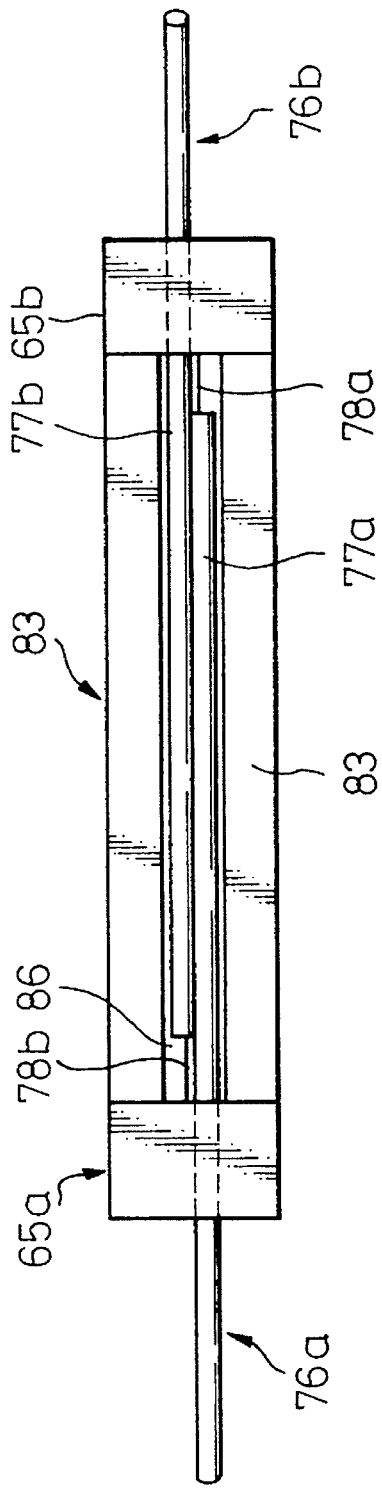

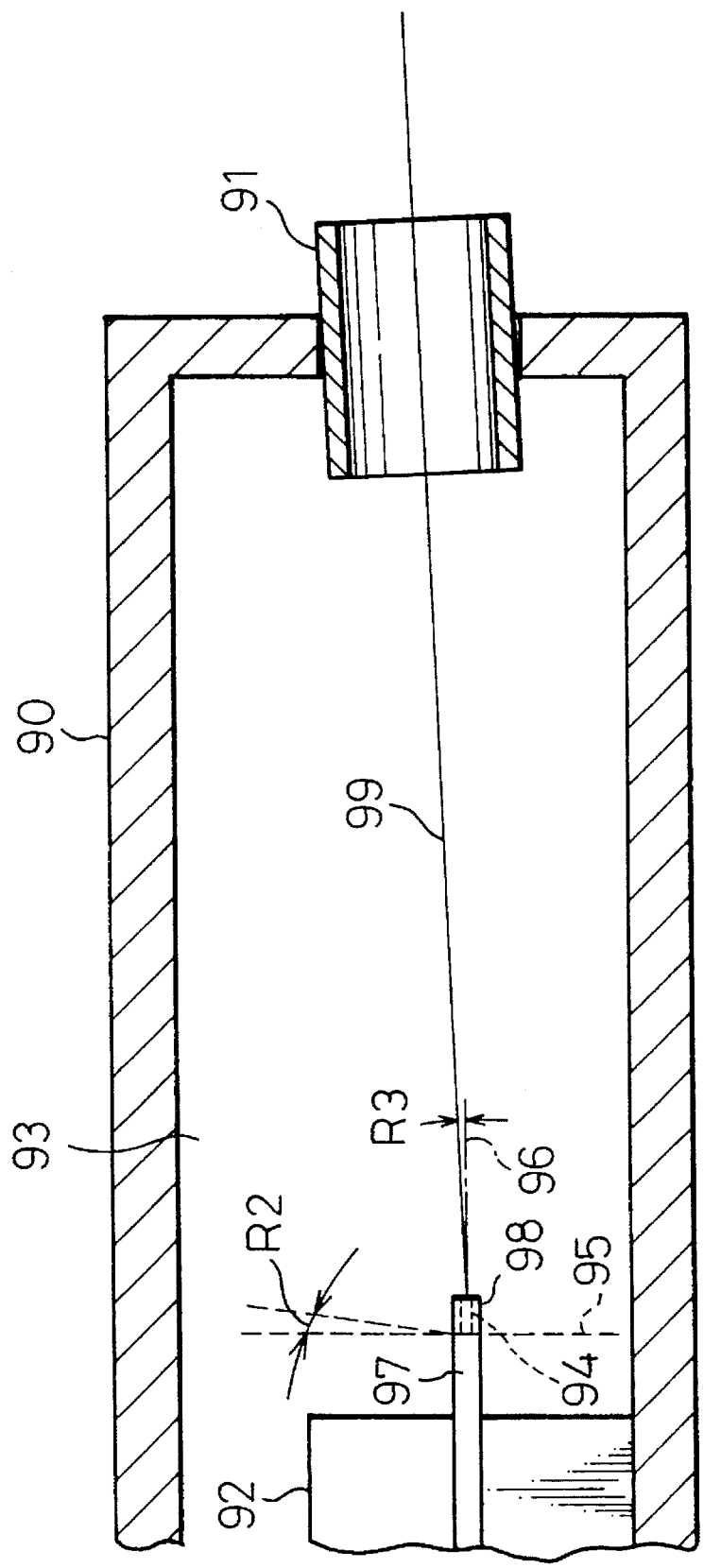

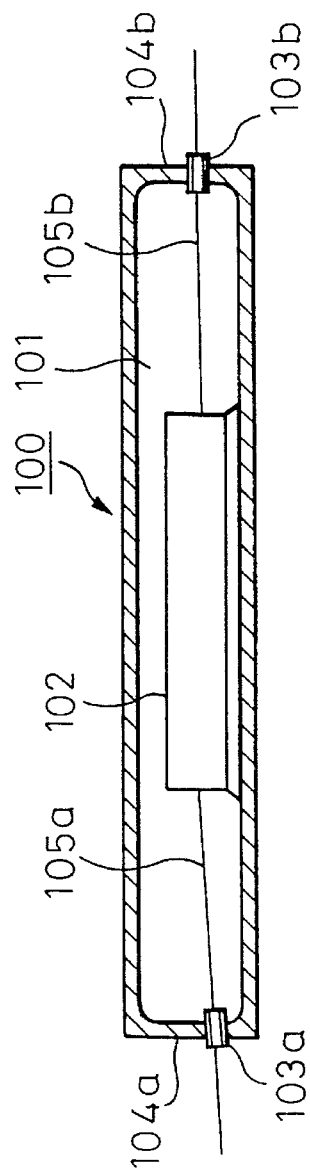
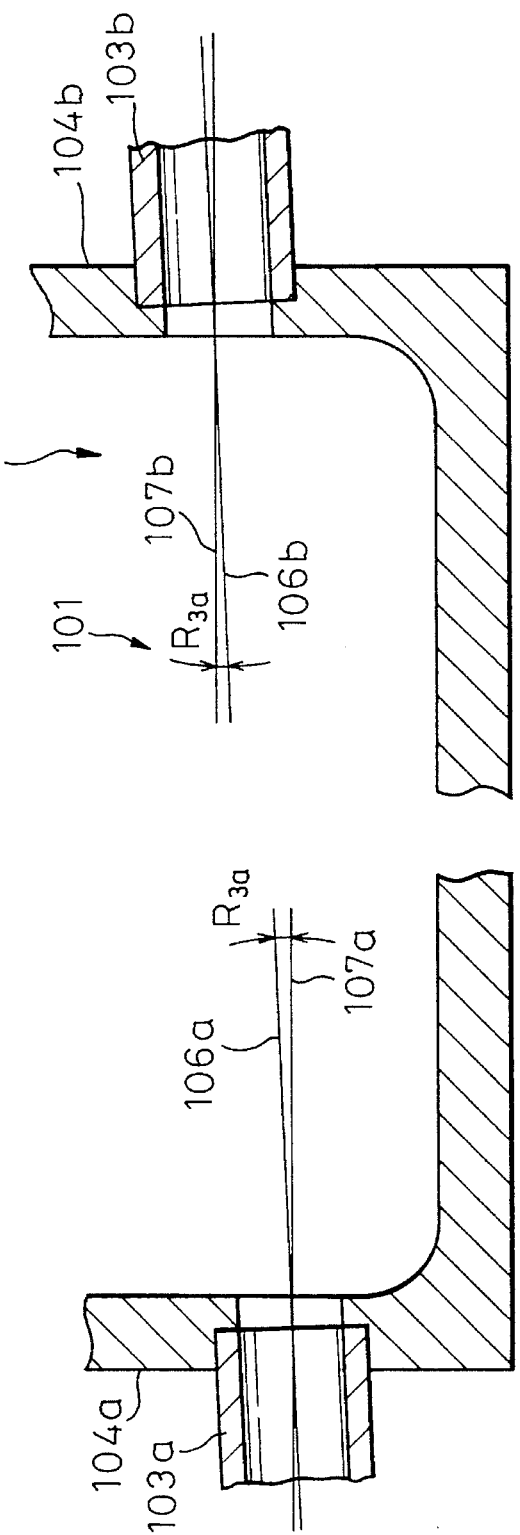
Fig.18
Fig.19

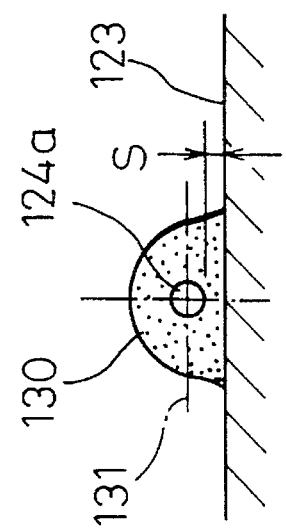
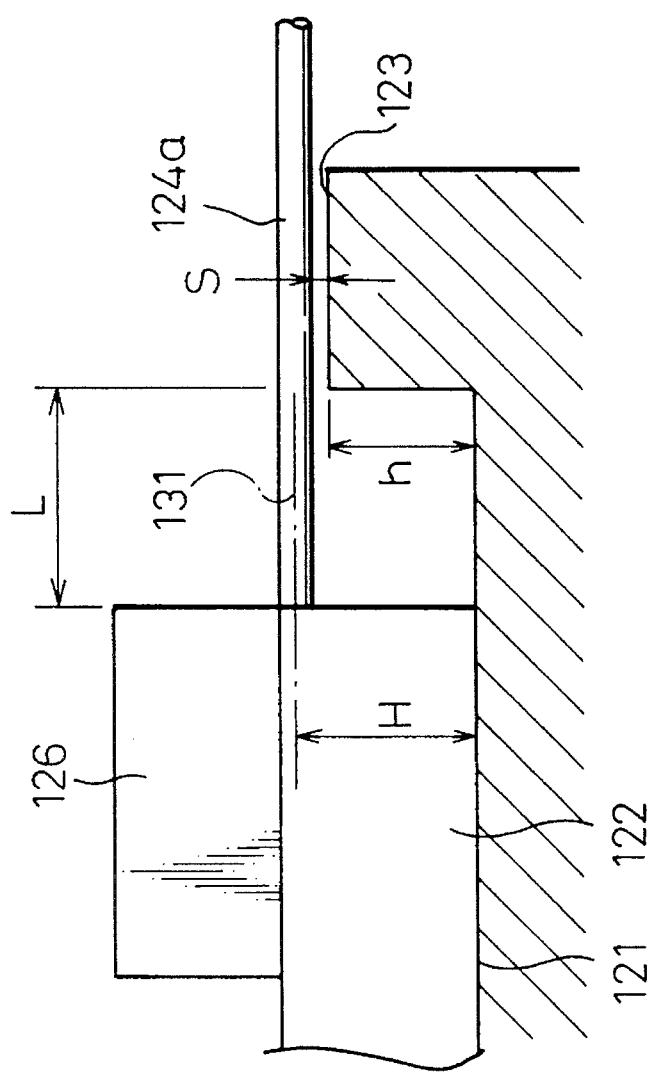

PACKAGE STRUCTURE FOR OPTICAL ELEMENT AND FIBERS AND COMPOSITE STRUCTURE THEREOF

BACKGROUND OF THE INVENTION

1. Field of the Invention

The present invention relates to a package structure for housing an optical element and gas-hermetically sealing optical fibers connected to the optical element, and a composite structure of an optical element and optical fibers housed and gas-hermetically sealed in the above-mentioned package structure.

The package structure and the optical element-optical fiber composite structure of the present invention are useful for optical devices comprising an optical waveguide electro-optical element.

2. Description of the Related Art

In a conventional optical element-optical fiber composite structure in which an optical element is housed and gas-hermetically sealed in a package, a pair of optical fibers are connected to the optical element and extended to the outside of the package through sleeves attached to the package, and the sleeves are gas-hermetically sealed. Usually, each optical fiber comprises a naked core fiber, and coating layers comprising a primary coat layer formed on the naked core fiber and a secondary coat layer formed on the primary coat layer. When the optical fiber is connected to the optical element, at an end portion of the optical fiber, the coating layer is removed so as to expose the naked core fiber to the outside, and a portion of the naked core fiber adjacent to a portion of the optical fiber coated with the coating layer or the primary coat layer is surface-metallized with a metal, for example, nickel and gold. A terminal face of the naked fiber portion is connected to a terminal face of the optical element through an adhesive, and the surface-metallized fiber portion is bonded to the sleeve with a moisture-nonpermeable bonding material, for example, solder. Namely, a gap between the peripheral surface of the surface-metallized fiber portion of the optical fiber located in the sleeve and an inside peripheral surface of the sleeve is sealed by the solder.

Usually, the soldered surface-metallized fiber portion of the optical fiber exhibits a relatively low tensile strength of 0.5 to 1.5 kgf. An ideal tensile strength of the core fiber is about 6 kgf. Reasons for the reduction in the tensile strength of the soldered core fiber portion are assumed that microcracks are unavoidably formed on the naked core fiber portion while the coating layer is removed, a surface metallization is applied to the naked core fiber portion surface and soldering is applied to the surface-metallized core fiber portion.

Therefore, it is practically difficult to enhance the tensile strength of the soldered portion of the surface-metallized core fiber portion. However, this tensile strength, namely a seal-fixing strength of the optical fiber to the package, is unsatisfactory.

In a prior art, an attempt was made in which a portion of the optical fiber having the coating layer is inserted into the sleeve and the coating layer is bonded to the inside peripheral surface of the sleeve, to enhance the seal-fixing strength of the optical fiber to the package.

Nevertheless, this attempt is disadvantageous in that generally, the coating layer and the core fiber are significantly different in expansion coefficient from each other, namely the core fiber has an expansion coefficient of one tenth (1/10) or less that of the coating layer, the coating layer retains a stress generated during the formation thereof, and therefore, when a heating and cooling are cyclically applied to the optical fiber, the coating layer is expanded and shrunk to an extent larger than that of the core fiber. If the interfacial bonding strength between the coating layer and the core fiber is low, it appears that the core fibers are pushed out from the coating layer when the coating layer shrinks and are pulled into the coating layer when the coating layer expands. The pushing and pulling distance of the core fiber due to the above-mentioned phenomenon is variable depending on the type and the material of the coating layer. When the secondary coat layer is made of a polyamide resin, the pushing and pulling length of the core fiber sometimes reaches more than several hundred μm within temperature range of −20° and 70° C. Also it is practically impossible to eliminate this phenomenon.

In the above-mentioned type of sealing manner of the optical fiber to the sleeve, the optical fiber is fixed at two portions thereof spaced from each other, namely at the soldered portion of the surface-metallized fiber portion and the adhesive-bonded portion of the coating layer-coated portion. Where the core fiber pushed out from the coating layer, a non-fixed portion of the core fiber between the two fixing points is bent in the sleeve, and sometimes is broken by a compression buckling thereof due to a buckling stress (localized tensile stress) generated therein.

In practical use, the surface of the core fiber located in the sleeve is sometimes gradually corroded, and thus the buckling stress generated in the core fiber causes the corroded core fiber to be broken.

Accordingly, there is a strong demand for preventing the generation of the buckling stress in the core fiber.

To prevent the breakage of the core fiber due to the buckling stress, it has been attempted to make the distance between the fixing points of the optical fiber large enough to absorb and relax the deformation of the core fiber. However, this attempt was not successful because the large distance between the fixing points causes the resultant package structure for the optical element and the optical fibers to have too large a size.

SUMMARY OF THE INVENTION

An object of the present invention is to provide a package structure for housing an optical element and gas-hermetically sealing optical fibers connected to the optical element, capable of preventing breakage of the optical fibers by a buckling stress generated due to change in environmental temperature, and a composite structure of an optical element and optical fibers housed and gas-hermetically sealed in the package structure.

The above-mentioned object can be attained by the package structure and the optical element-optical fiber composite structure of the present invention.

The package structure of the present invention for housing an optical element and gas-hermetically sealing optical fibers connected to the optical element, comprises a main container provided with a main chamber for housing an optical element therein;

a pair of side containers attached to the main container and provided with a pair of side chambers formed therein and separated from the main chamber through a pair of side walls, and having a pair of apertures through which the side chambers are connected to the outside of the side chambers; and a pair of sleeves extending from or across the side walls and provided with a pair of hollow spaces through which the main chamber is connected to the side chambers;

said apertures and side chambers of the side containers and said hollow spaces of the sleeves being suitable for introducing a pair of optical fibers into the main chamber of the main container therethrough, to connect the optical fibers to the optical element.

In the present invention, the package structure is used to form an optical element-optical fiber composite structure.

In this composite structure of an optical element and optical fibers housed and gas-hermetically sealed in the package structure, an optical element is housed in the main chamber; end portions of optical fibers which comprise secondary coat sections thereof composed of core fibers and primary and secondary coatings, primary coat sections thereof continued from the secondary coat sections and composed of core fibers and primary coatings, surface-metallized core fiber sections thereof continued from the primary coat sections and composed of surface-metallized core fibers, and naked core fiber sections thereof continued from the surface-metallized core fiber sections and composed of naked core fibers, are introduced into the main chamber through the apertures and side chambers of the side containers and the hollow spaces of the sleeves; the terminal faces of the naked core fiber sections are connected to the terminal faces of the optical element; moieties of the surface-metallized core fiber sections located in the hollow spaces of the sleeves are fixed to the sleeves through moisture-non-permeable bonding material layers formed in gaps between the surface-metallized core fiber moieties and the inside peripheral surfaces of the sleeves; and moieties of the secondary coat sections located in the apertures of the side containers are fixed to the side containers.

BRIEF DESCRIPTION OF THE DRAWINGS

FIG. 16(A) is an explanatory plane view of another embodiment of the optical element-optical fiber composite structure of the present invention containing the container structure of FIGS. 14(A) to 15(C), from which lids are omitted;

FIG. 16(B) is an explanatory back view of the optical element-optical fiber composite structure of FIG. 16(A);

FIG. 17 shows a relationship between a center line of a sleeve and an axial line of an optical element of another embodiment of the optical element-optical fiber composite structure of the present invention;

FIG. 18 shows an explanatory cross-sectional front view of an embodiment of the optical element-optical fiber connection in the main container of the present invention in which the optical fibers are connected at an inclined angle to an axial line of the optical element;

FIG. 19 is an explanatory cross-sectional front view of portions of the main container of the present invention in which the center lines of sleeves attached to the main container inclines to an axial line of the optical element;

FIG. 24(A) is an explanatory cross-sectional view of a portion of a main container usable for the present invention;

FIG. 24(B) is an explanatory cross-sectional view of a core fiber section of an optical fiber fixed to the main container of FIG. 24(A);

DESCRIPTION OF THE PREFERRED EMBODIMENTS

Figure 1:
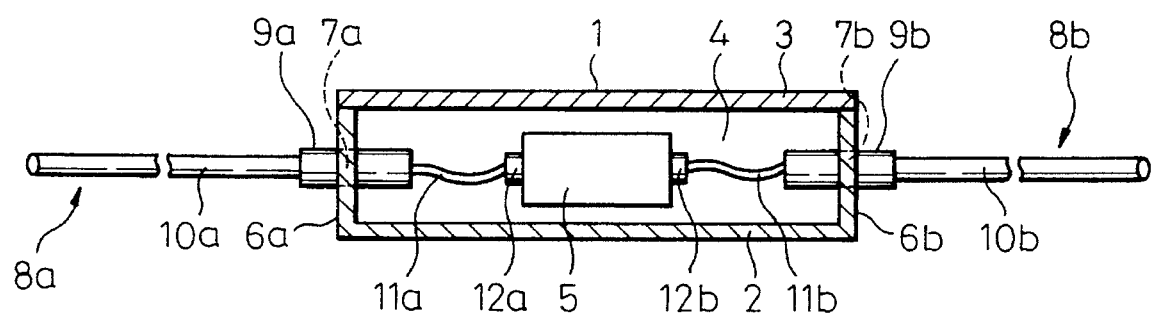
FIG. 1 is an explanatory cross-sectional front view of a conventional optical element-optical fiber composite structure housed in a conventional package structure.

FIG. 1 shows a cross-sectional view of a conventional optical element-optical fiber composite structure in which an optical element is housed in a package and optical fibers connected to the optical element are gas-hermetically sealed.

In FIG. 1, a container 1 is a hexahedron box composed of a receptacle member 2 and a lid member 3 with which the receptacle member 2 is gas-hermetically sealed, for example, by seam welding. In the receptacle member 2, an optical element 5 is housed and fixed in an inside chamber 4 of the receptacle member 2.

A pair of side wall portions 6a and 6b of the container 1 face each other and are provided with a pair of apertures 7a and 7b formed therein. Into the apertures 7a and 7b, a pair of sleeves 9a and 9b having hollow spaces (not shown in FIG. 1) for passing a pair of optical fibers 8a and 8b therethrough, are inserted and fixed. The optical fibers each have a core fiber and a coating layer comprising a primary coat layer formed on the core fiber and a secondary coat layer formed on the primary coat layer. In FIG. 1, the optical fibers 8a and 8b are inserted into the hollow spaces of the sleeves 9a and 9b in such a manner that in each optical fiber, an end portion 11a or 11b consisting of the core fiber enters from the sleeve 9a or 9b into the inside chamber 4 and another portion 10a or 10b in which the core fiber is coated by the coating layer is introduced into the hollow space of the sleeve 9a or 9b.

In the portions of the optical fibers 8a and 8b entered into the inside chamber 4, the primary and secondary coat layers are removed so that the remaining core fibers 11a and 11b are exposed to the outside, and the peripheral surfaces of the exposed core fibers 11a and 11b are plated or metallized with a metal, for example, gold or a bi-layer of gold and nickel. Portions of the surface-metallized core fiber portions 11a and 11b located in the hollow spaces of the sleeves 9a and 9b are bonded to the inside peripheral surfaces of the sleeves 9a and 9b with solder so as to seal gaps between the optical fiber portions 11a and 11b and the inside peripheral surfaces of the sleeves 9a and 9b. Namely, the optical fiber portions located in the sleeves are gas-hermetically sealed. In the prior arts, generally, the surface-metallized core fiber portions 11a and 11b located in the inside chamber 4 are bent or curved as indicated in FIG. 1, and the terminal faces of the core fibers 11a and 11b are connected to terminal faces of the optical element 5. The connecting portions are protected and reinforced by optical fiber connection-reinforcing devices 12a and 12b such as glass capillaries.

Figure 2:
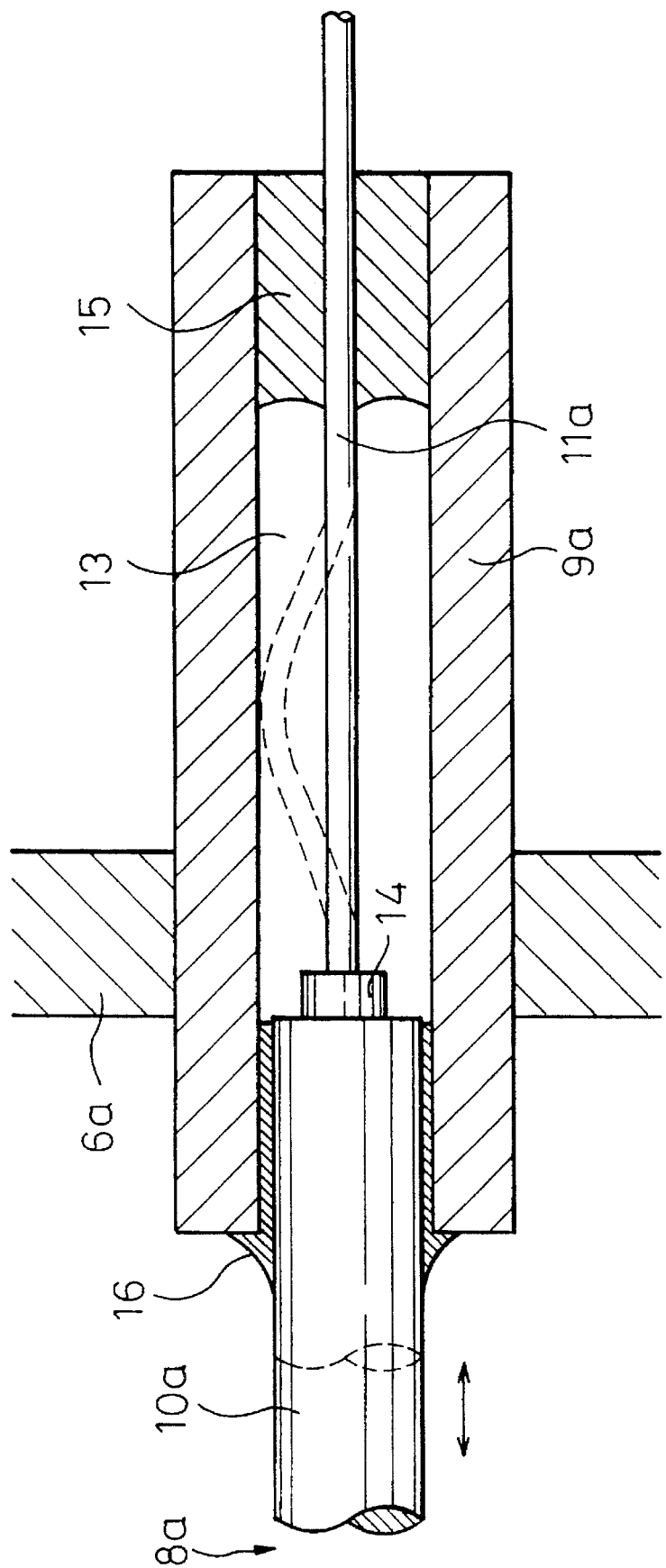
FIG. 2 is an enlarged explanatory cross-sectional view of a sleeve portion of the conventional composite package structure of FIG. 1.

FIG. 2 shows an enlarged cross-sectional view of the sleeve and the optical fiber portion inserted into the sleeve, as shown in FIG. 1. In FIG. 2, a sleeve 9a having a hollow space 13 is inserted through a side wall 6a of a container. An optical fiber 8a has a coating layer-coated portion 10a, a primary coat layer-coated portion 14 and a surface-metallized core fiber portion 11a, and is inserted into the sleeve 9a. The coating layer-coated portion 10a of the optical fiber 8a is located in an inlet portion of the sleeve 9a and bonded to the sleeve 9a by a bonding material 16 such as an epoxy adhesive material. The surface-metallized core fiber portion 11a of the optical fiber 8a is fixed in an outlet portion of the sleeve 9a with solder 15.

Namely, the optical fiber portion located in the sleeve is fixed at two points spaced from each other.

As mentioned above, in the conventional optical element-optical fiber composite structure, the surface-metallized core fiber portion 11a of the optical fiber 8a located in the hollow space 13 of the sleeve 9a is bent or curved as shown by broken lines when the core fiber portion 11a is heated and cooled, and protrudes, and this phenomenon causes the core fiber portion to be broken due to a buckling stress generated therein.

In the package structure of the present invention, the package structure comprises a main container having a main chamber formed therein for housing an optical element therein; a pair of side containers attached to the main container and provided with a pair of side chambers formed therein and separated from the main chamber through a pair of side walls, and having a pair of apertures through which the side chambers are connected to the outside thereof; and a pair of sleeves extending from or across the side walls and provided with a pair of hollow spaces through which the main chamber is connected to the side chambers.

In the package structure of the present invention, the apertures and side chambers of the side containers and the hollow spaces of the sleeves are suitable to introduce end portions of a pair of optical fibers into the main chamber of the main container therethrough, to connect the optical fibers to the optical element placed in the main chamber.

In the package structure of the present invention, the sleeves may extend from the side walls separating the side chambers from the main chamber only in directions opposite to the main chambers. Namely, the sleeves project only into the side chambers.

Also, in the package structure of the present invention, the side containers may be in the form of cylinders surrounding the sleeves.

Alternatively, in the container structure of the present invention, the side containers may be in the form of hexahedrons.

Further, in each side container of the package structure of the present invention, a center line of the aperture of the side container and a center line of the hollow space of the corresponding sleeve opening to the side chamber of the side container may be laid on one and the same straight line. In this case, an optical fiber can be introduced in a straight line form into the main chamber through the aperture of the side container and the hollow space of the sleeve.

Alternatively, in each side container of the package structure of the present invention, a center line of the aperture of the side container may intersect a center line of the hollow space of the corresponding sleeve. In this case, an optical fiber introduced into the side chamber of the side container is curved between the aperture of the side container and the corresponding sleeve. The intersecting angle between the aperture center line and the hollow space center line is preferably more than zero but not more than 90 degrees, namely, at a right angle or an acute angle.

Figure 3:
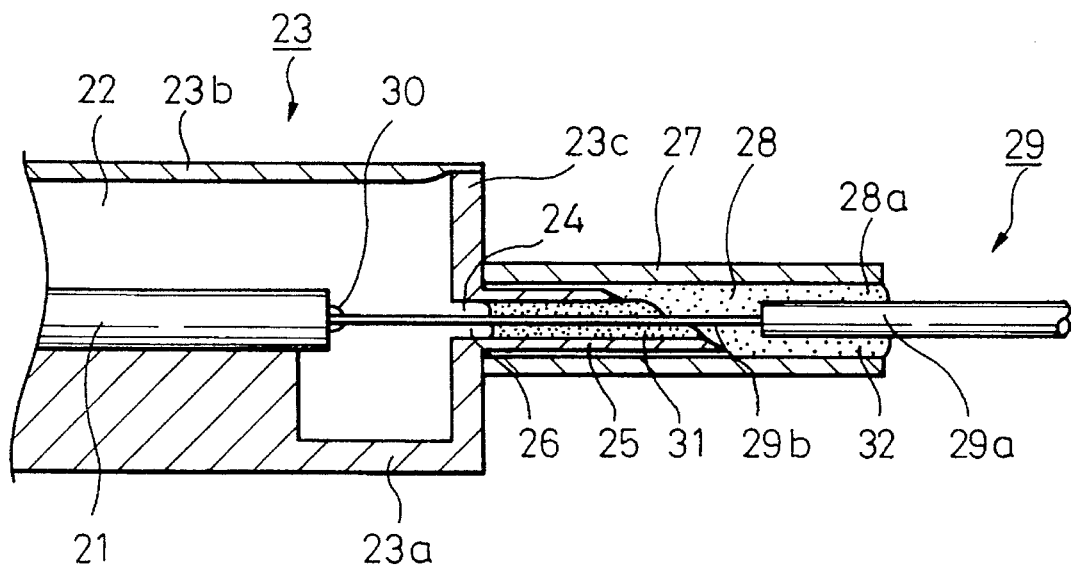
FIG. 3 is an explanatory cross-sectional front view of a right half portion of an embodiment of the optical element-optical composite structure containing the package structure of the present invention.

In the embodiments of the package structure of the present invention shown in FIG. 3, an optical element 21 is housed in a main chamber 22 of a main container 23. The main container 23 is composed of a receptacle member 23a and a lid member 23b. In the receptacle member 23a, a side wall 23c has an aperture 24. A sleeve 25 is attached to the side wall 23c so that a hollow space 26 is connected to the aperture 24 of the side wall 23c. The sleeve 25 extends only outward from the main container 23.

A side container 27 in the form of a cylinder is attached at an inside end thereof to the side wall 23c of the main container 23 so as to cover the sleeve 25. The side container 27 has a side chamber 28 and the aperture of the side container 27 is an outside end opening 28a of the cylinder.

In the embodiment of the optical element-optical fiber composite structure of the present invention shown in FIG. 3, an end portion of an optical fiber 29 is introduced into the main chamber 22 through the side container 27 and the sleeve 25. In the end portion of the optical fiber 29, a coating layer-coated section 29 is located in the outside end opening portion 28a of the side chamber 28, a surface-metallized core fiber section 29b is located in the remaining portion of the side chamber 28 and the hollow space 26 of the sleeve 25 and further enters into the main chamber 22. A terminal face of the core fiber is connected to a terminal face of the optical element 21 to form an optical connection 30.

In FIG. 3, the hollow space 26 of the sleeve 25 is sealed with a moisture-non-permeable bonding material 31, for example, solder, so that the surface-metallized core fiber section located in the hollow space 26 of the sleeve 25 is firmly bonded to the inside peripheral surface of the sleeve 25. Also, the side chamber 28 of the side container 27 is filled with a filler 32, for example, a silicone resin or an epoxy adhesive material, so that the section of the optical fiber 29 located in the side chamber 28 is stably held in the side container 27. Also a gap between the coating layer-coated section 29a of the optical fiber 29 and the inside peripheral surface of the side container 27 is sealed by the filler. The filler 32 is effectively used to prevent the breakage of the core fiber section of the optical fiber 29.

In FIG. 3, the sleeve 25 extends only into the cylindrical side container 27. In this type of sleeve, the solder sealing at a high temperature is carried out outside of the main chamber. Therefore, the core fiber section located in the main chamber is not deteriorated by the solder-sealing process at a high temperature.

In FIG. 3, the outside end of the sleeve 25 is inclined upward. The upwardly inclined end of the sleeve 25 effectively receives a solder melt and smoothly introduces the solder melt into the hollow space 26.

Figure 4:
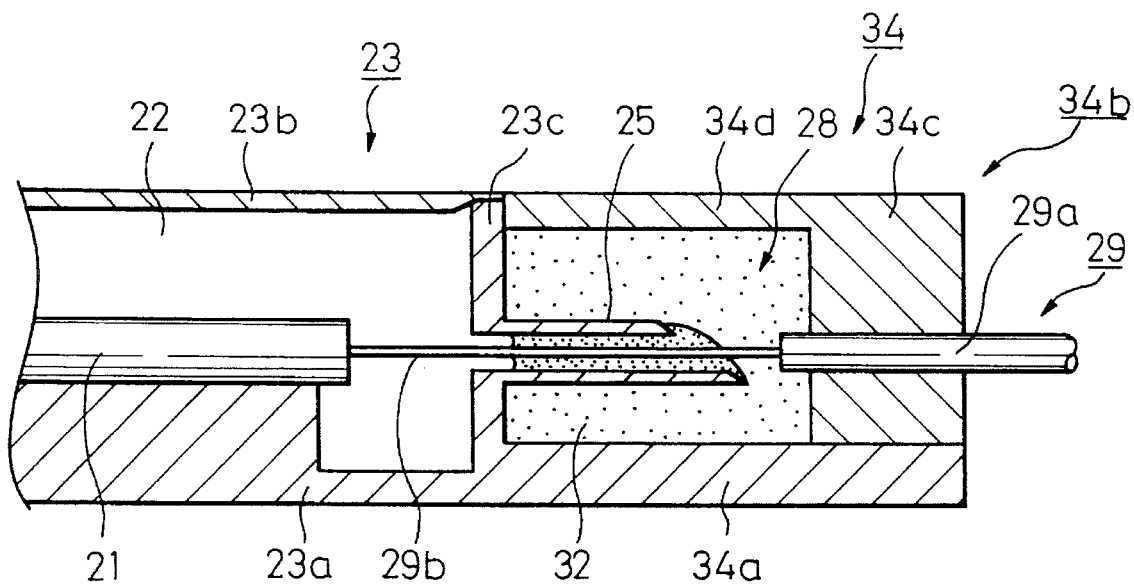
FIG. 4 is an explanatory cross-sectional front view of a right half portion of another embodiment of the optical element-optical fiber composite structure containing the package structure of the present invention.

In FIG. 4, a side chamber 34 is in the form of a hexahedron. This side chamber 34 is composed of a bottom 34a extending outwardly from the side wall 23c and a hood member 34b attached to the side wall 23c and the bottom 34a and consisting of three walls 34c and a roof 34d. The hood member 34b is fixed to the side wall 23c and the bottom 34a by an adhesive material or screws. A side wall of the hood member 34b facing the side wall 23c of the main container 23 has an aperture for inserting an optical fiber 29.

Figure 5:
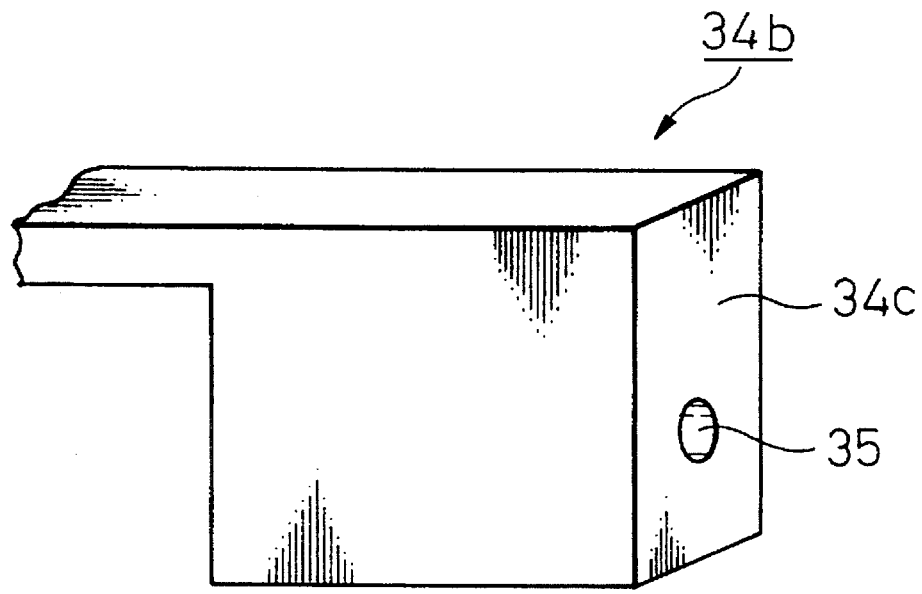
FIG. 5 is an explanatory perspective view of a hood member for forming a side container.
Figure 6:
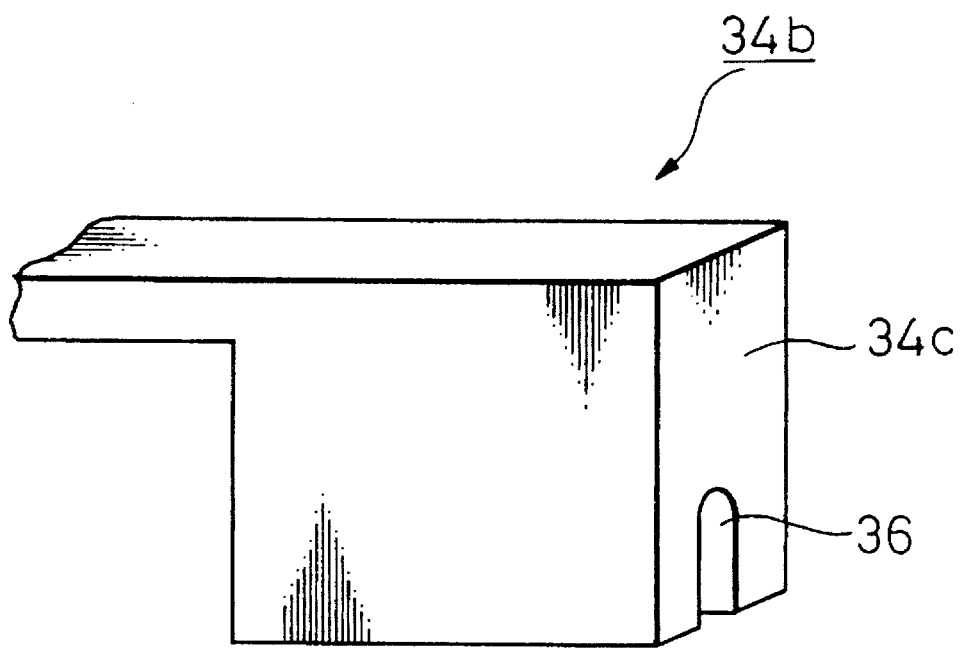
FIG. 6 is an explanatory perspective view of another hood member for forming a side container.

FIG. 5 shows an example of the hood member 34b. In FIG. 5, the side wall 34c has a circular aperture 35. FIG. 6 shows another example of the hood member 34b. In the side wall 34c of FIG. 6, the aperture is in the form of a reversed U-shaped channel 36. The lower end of the reversed U-shaped channel 36 is blocked by the bottom (not shown in FIG. 6), to form an aperture. Referring to FIGS. 4, 5 and 6, a gap between the inside peripheral surface of the aperture 35 or 36 and the coating layer-coated section 29a of the optical fiber 29 is packed with a resin, for example, a silicone resin or an epoxy adhesive material, to fix the optical fiber 29 to the side container 34. Also, the side chamber 28 is packed with a soft filler, for example, a silicone resin or an epoxy adhesive material 32.

In the package structure of the present invention, the main container and the side container are made from a metal material, for example, a stainless steel and the inside peripheral surfaces of the containers are preferably plated with a nickel and/or gold which enables the inside peripheral surfaces to be soldered.

The core fiber section located in the package structure of the present invention is metallized with nickel and/or gold, and the moisture non-permeable bonding material is preferably a Pb-Sn alloy solder.

Figure 7:
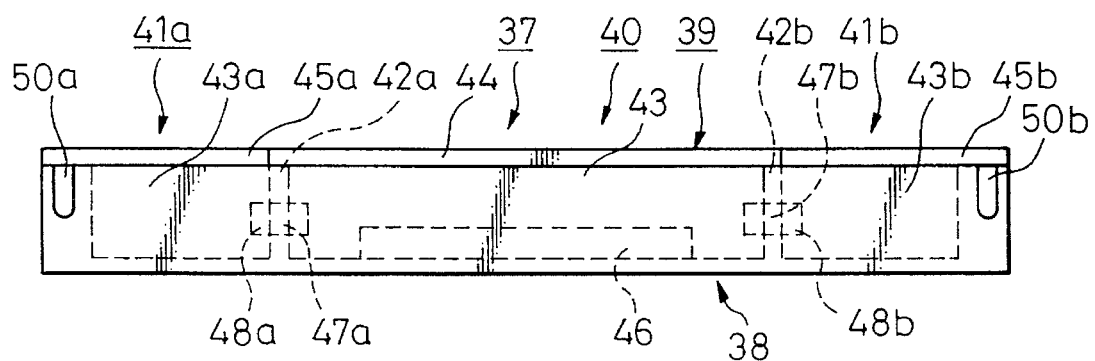
FIG. 7 is an explanatory front view of another embodiment of the package structure of the present invention.
Figure 8:
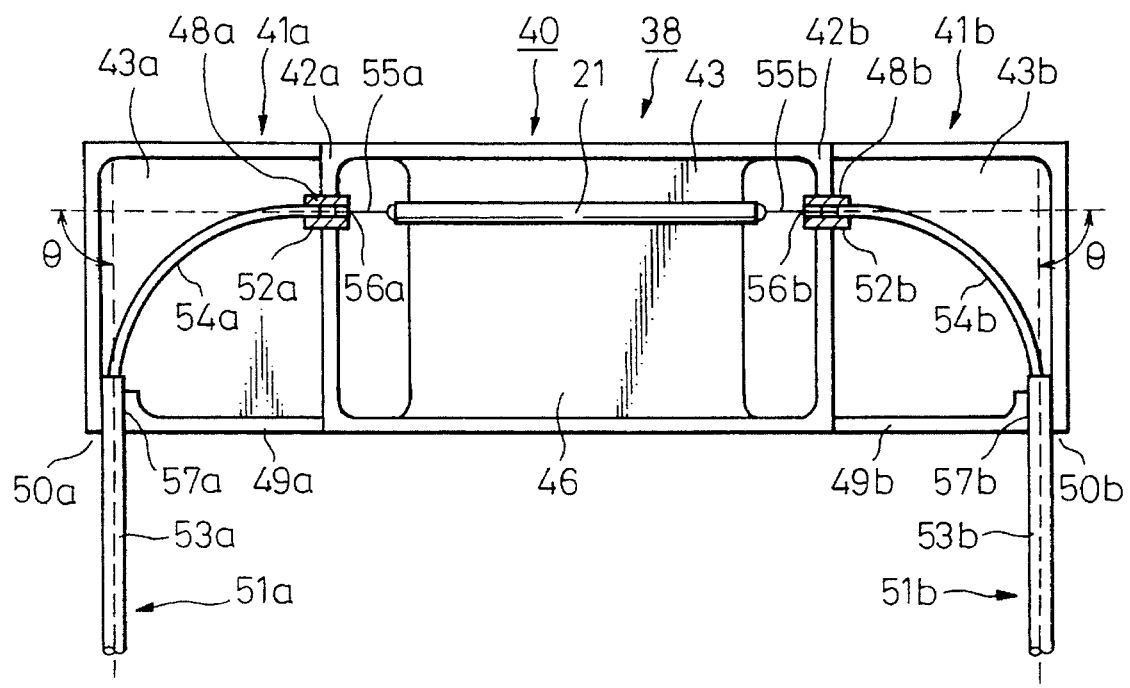
FIG. 8 is an explanatory partially cross-sectional plane view of another embodiment of the optical element-optical fiber composite structure using the package structure of FIG. 7, of the present invention.

Referring to FIGS. 7 and 8, a package structure 37 of the present invention comprises a receptacle member 38 and a lid member 39 by which the upper opening of the receptacle member 38 is gas-hermetically sealed. Also, the package structure 37 comprises a main container 40 and side containers 41a and 41b separated from the main container 40 by side walls 42a and 42b. The main container 40 has a main chamber 43 and the side containers 41a and 41b have side chambers 43a and 43b. The lid member 39 may be composed of a lid 44 for the main container 40 and lids 45a and 45b for the side containers 41a and 41b. The main container 40 has a stand 46 for fixing an optical element 21. In the side walls 42a and 42b, apertures 47a and 47b are formed and sleeves 48a and 48b are inserted into the apertures. In front walls 49a and 49b of the side containers 41a and 41b, apertures 50a and 50b are formed to provide passages for the optical fibers 51a and 51b. The apertures 50a and 50b may be in the form of slots opening upward and closed by the lid members 45a and 45b.

In FIG. 8, the sleeves 48a and 48b have hollow spaces 52a and 52b. The center line of the hollow spaces 52a and 52b intersect the center line of the apertures 50a and 50b of the side containers 41a and 41b at an angle θ of more than zero but not more than 90 degrees.

In FIG. 8, end portions of coating layer-coated sections 53a and 53b of the optical fibers 51a and 51b are inserted into the apertures 50a and 50b, primary coat layer-coated sections 54a and 54b of the optical fibers 51a and 51b are located in the side chambers 43a and 43b and gradually curved, end portions of the primary coat layer-coated sections 54a and 54b are inserted into the hollow spaces 52a and 52b of the sleeves 41a and 41b, and portions of surface-metallized core fiber sections 55a and 55b located in the hollow spaces 52a and 52b are fixed to the sleeves 48a and 48b by solder layers 56a and 56b. The end portions of the coating layer-coated sections 53a and 53b of the optical fibers 51a and 51b inserted into the apertures 50a and 50b are fixed to the side containers 41a and 41b by adhesive layers 57a and 57b or by a mechanical caulking. In this embodiment of the optical element-optical fiber composite structure shown in FIG. 8, relatively long sections of the optical fibers can be contained in the side containers without excessively deforming the optical fibers. This feature is effective to prevent the buckling breakage of the core fiber sections of the optical fibers located in the hollow spaces of the sleeves, due to the pushing out phenomenon of the core fiber sections. Preferably, the length of the primary coat layer-coated section of the optical fiber located in a gradually curved form in the side container is in the range of from 20 to 50 mm.

In the package structure shown in FIGS. 7 and 8, the side containers may be separable from the main container. In the preparation of the optical element-optical fiber composite structure by using the separable package structure, the optical element is placed and fixed in the main chamber of the main container, the core fiber sections of the optical fibers are introduced into the main chamber through the hollow spaces of the sleeves, and the terminal faces of the core fiber sections are connected to the terminal faces of the optical element. The core fiber sections located in the sleeves are fixed by solder so as to gas-hermetically seal the hollow spaces of the sleeves.

The side containers are attached to the main containers and fixed thereto by an adhesive or screws. The end portions of the coating layer-coated sections of the optical fibers are inserted into the apertures of the side chambers and fixed by an adhesive to the side containers so that the primary coat layer-coated sections of the optical fibers are gradually curved in the side chambers. Finally, the main container and the side containers are gas-hermetically closed by lids.

In FIG. 8, the apertures 50a and 50b of the side containers 41a and 41b are located in the front walls 49a and 49b. However, one of the apertures may be located in a front wall of a side container and the other one of the apertures may be located in a back wall of the other side container.

Figure 9:
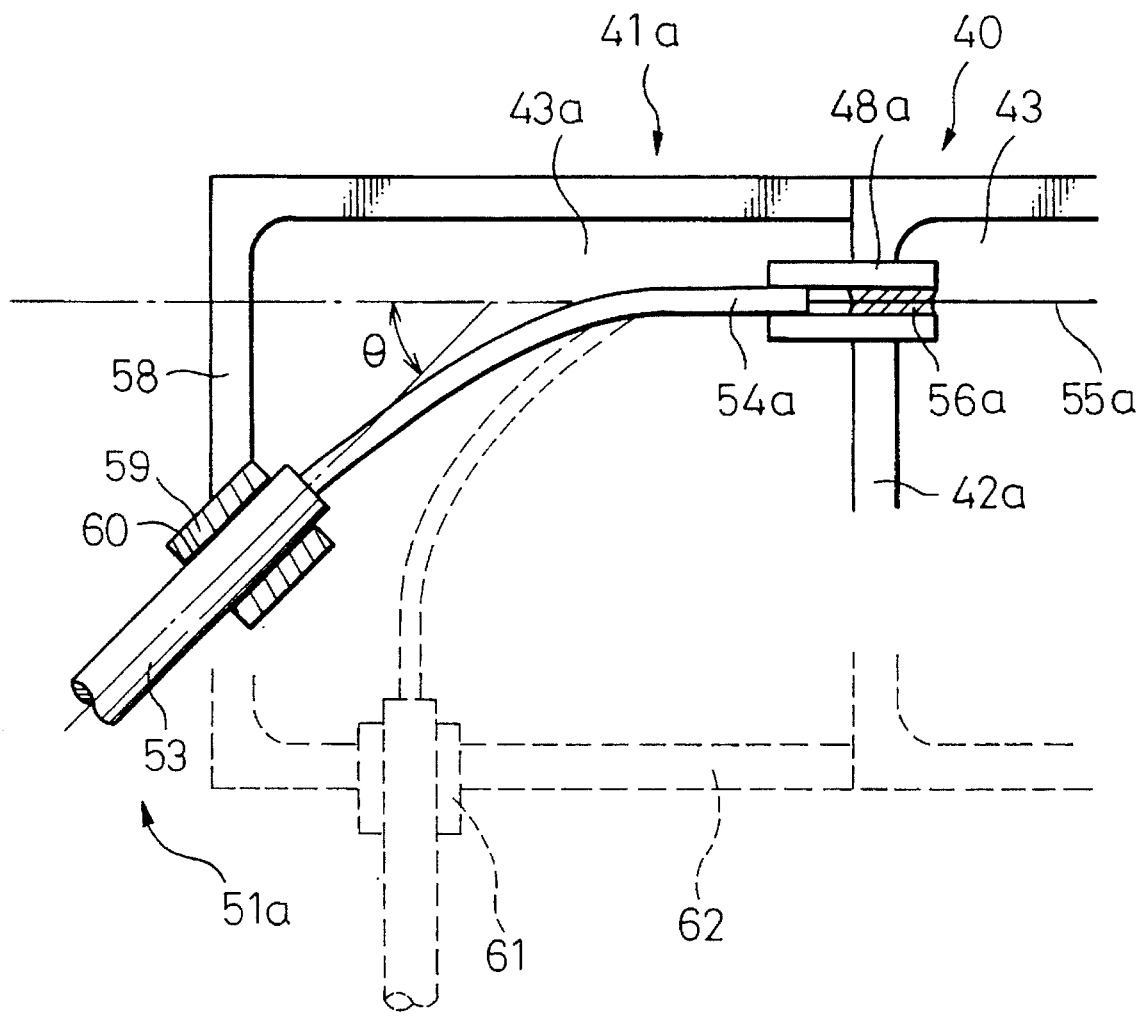
FIG. 9 is an explanatory partially cross-sectional plane view of a left half portion of another embodiment of the optical element-optical fiber composite structure of the present invention.

In FIG. 9, as shown by solid lines, an aperture is formed in a side wall 58 of the side container 41a facing the side wall 42a of the main container 40, and into the aperture, a side container sleeve 59 is inserted and fixed thereto. Into the sleeve 59, an end portion of a coating layer-coated section 53a of an optical fiber 51a is inserted and bonded thereto by an adhesive layer 60. In this embodiment, the intersecting angle θ between the center line of the sleeve 48a of the main container 40 and the sleeve 59 of the side container 41a is less than 90 degrees, and thus the primary coat layer-coated section 54a of the optical fiber 51a is slightly curved in the side chamber 43a.

Figure 10:
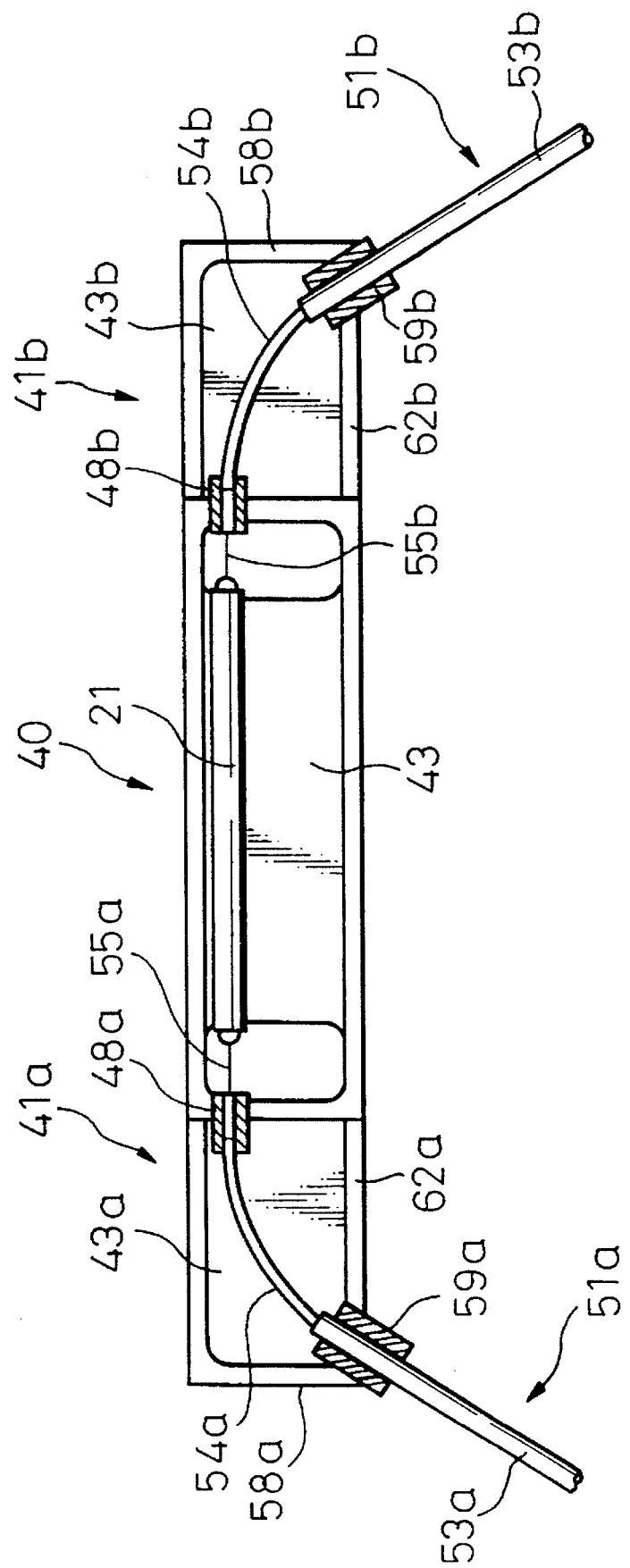
FIG. 10 is an explanatory partially cross-sectional plane view of another embodiment of the optical element-optical fiber composite structure of the present invention.

In FIG. 9, as shown by broken lines, the aperture and sleeve 61 of the side container 41a are provided in a side wall 62 connected to the side wall 42a of the main container 40. In this case, the intersecting angle θ between the center line of the main container sleeve 48a and the center line of the side containers sleeve 61 is 90 degrees. Referring to FIG. 10, side container sleeves 59a and 59b are arranged at corners between the side wall 58a and 58b, and the side wall 62a and 62b so that the intersecting angle becomes less than 90 degrees, for example, about 45 degrees.

The side chambers may be packed with a soft resinous filler, for example, a silicone resin or an epoxy adhesive material, which effectively protects the optical fibers in the side containers from mechanical shocks, for example, vibrations.

In an embodiment of the package structure of the present invention, the side chambers of the side containers are connected to each other through a connecting passage arranged outside of the main container. The connecting passage allows a pair of optical fibers to be introduced from one of the side chambers to the other one therethrough.

The above-mentioned type of package structure of the present invention has the following advantages.

(1) The optical fibers can be fixed in coating layer-coated sections thereof to the side containers, and thus core fiber sections of the optical fibers located in the main chamber are prevented from harmful stress and the sealing conditions of the sleeves attached to the main container can be stably maintained at a good level over a long period of time.

(2) Since sections of the optical fibers between the apertures of the side containers and the sleeves of the main container can be made long and curved, the core fiber sections of the optical fibers located in the main chamber can be prevented from harmful stress and the sealing conditions of the sleeves of the main container can be maintained at a good level with a high degree of stability over a long period of time.

Figure 11:
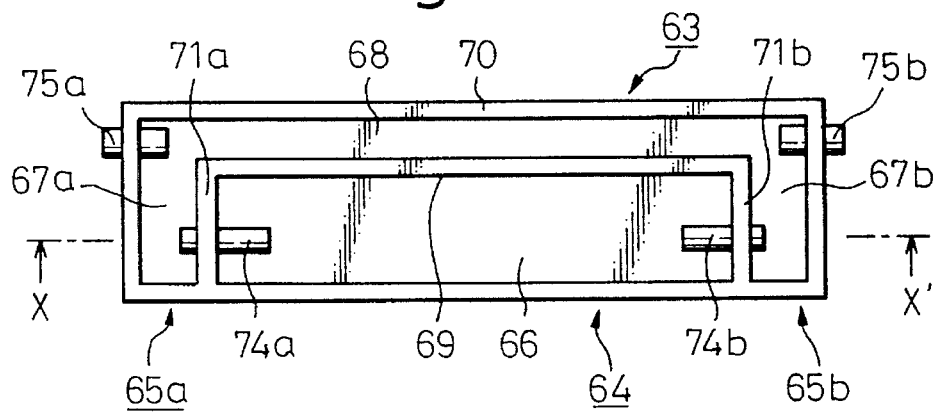
FIG. 11 is an explanatory plane view of another embodiment of the package structure of the present invention from which a lid is omitted.
Figure 12:
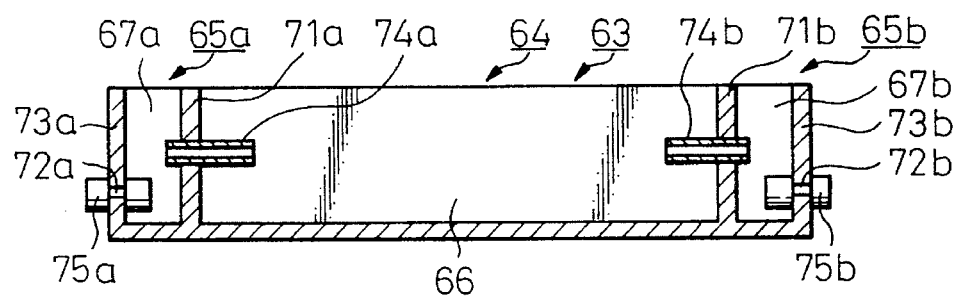
FIG. 12 is an explanatory cross-sectional front view of the package structure of FIG. 11 along a line X—X.

Referring to FIGS. 11 and 12, a package structure 63 of the present invention comprises a main container 64 and side containers 65a and 65b. The main container 64 has a main chamber 66 formed therein and the side containers 65a and 65b have side chambers 67a and 67b formed therein. The package structure 63 is further provided with a connecting passage 68 formed between a side wall 69 of the main container 64 and a connecting side wall 70 through which the side containers 65a and 65b are connected to each other. The connecting passage 68 allows the side chambers 67a and 67b to be connected to each other therethrough.

The side chambers 67a and 67b are separated from the main chamber 66 through side walls 71a and 71b. The side containers 67a and 67b have apertures 72a and 72b formed in side walls 73a and 73b facing the side walls 71a and 71b. The main container 64 has sleeves 74a and 74b attached to the side walls 71a and 71b. To the apertures 72a and 72b of the side containers 65a and 65b, optical fiber-fixing means, for example, sleeves 75a and 75b are attached.

Figure 13:
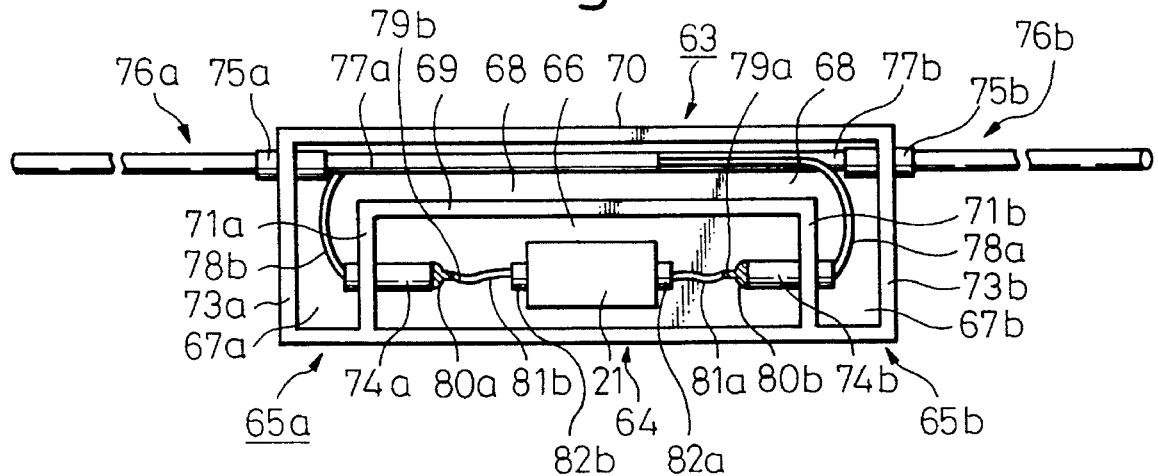
FIG. 13 is an explanatory plane view of another embodiment of the optical element-optical fiber composite structure containing the package structure of FIGS. 11 and 12, from which a lid is omitted.

Referring to FIG. 13, optical fibers 76a and 76b are introduced into the package structure 63. End portions of coating layer-coated sections 77a and 77b of the optical fibers 76a and 76b are introduced into the connecting passage 68 through the optical fiber-fixing means 75a and 75b and the side chambers 67a and 67b, and are fixed by the optical fiber-fixing means 75a and 75b. Primary coat layer-coated sections 78a and 78b extend through the connecting passage 68 and the side chambers 67b and 67a, while gradually curving, and are inserted into the sleeves 74a and 74b. In the sleeves 74b and 74a, core fiber sections 79a and 79b which have been surface-metallized by plating or vacuum-depositing a metal, for example, gold, are gas-hermetically fixed to the sleeves 74b and 74a by solder or adhesive, layers 80b and 80a. Naked core fiber sections 81b and 81a of the optical fibers 76a and 76b located in the main chamber 66 are optionally slightly curved and connected at terminal faces thereof to the terminal faces of the optical element. The connections of the optical fiber terminal faces to the optical element terminal faces are protected by protectors 82b and 82a. The main and side containers and the connecting passage are gas-hermetically sealed by a lid (not shown).

Figure 14:
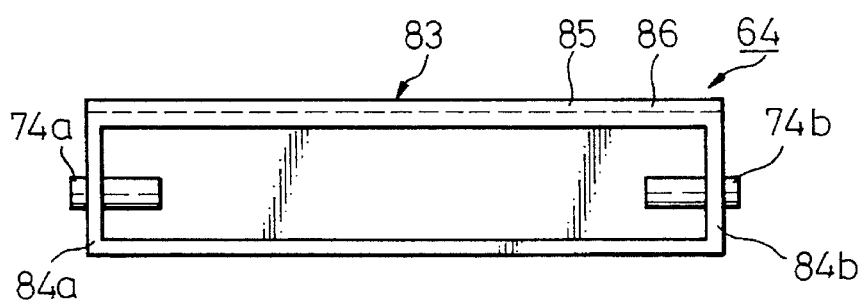
FIG. 14(A) is an explanatory plane view of an embodiment of the main container usable for the present invention, from which a lid is omitted.
FIG. 14(B) is an explanatory front view of the main container of FIG. 14(A)
FIG. 14(C) is an explanatory side view of the main container of FIGS. 14(A) and 14(B)
Figure 14:
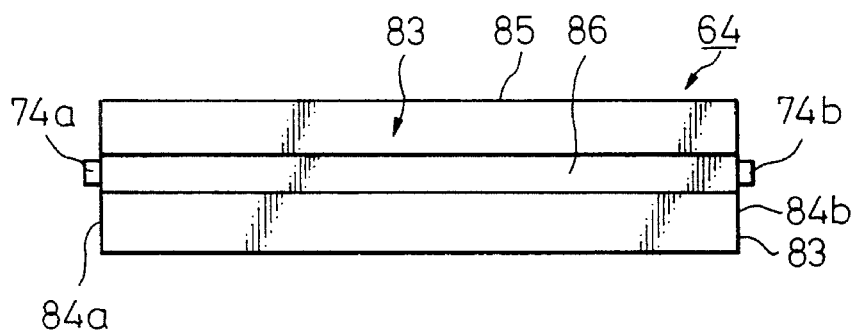
Figure 14:
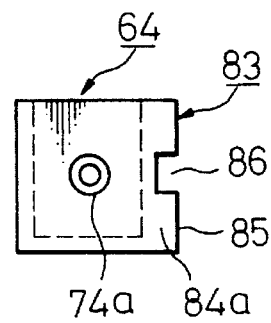

Referring to FIGS. 14(A), 14(B) and 14(C), an embodiment of the main container 64 is in the form of a hexahedron and composed of a receptacle member 83 and a lid member (not shown) for gas-hermetically closing the receptacle member 83. To a pair of side walls 84a and 84b of the receptacle member 83, sleeves 74a and 74b are attached. On a front wall 85 of the main container 64, a groove 86 is formed as a connecting passage for the optical fibers.

Figure 15A:
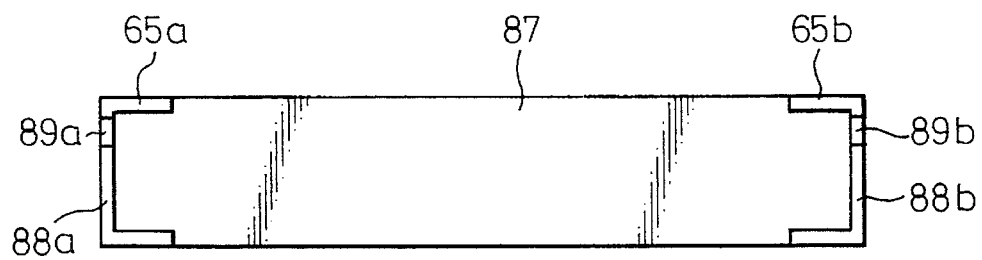
FIG. 15(A) is an explanatory plane view of an embodiment of the side containers usable for the main container of FIG. 14 of the present invention, from which lids are omitted.
Figure 15B:
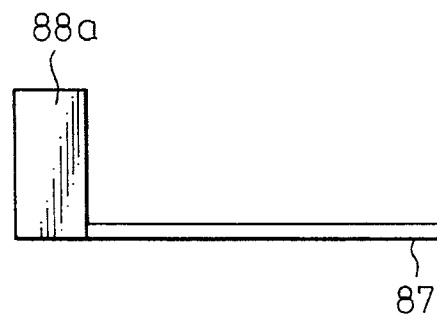
FIG. 15(B) is an explanatory front view of the side containers of FIG. 15(A)
Figure 15C:
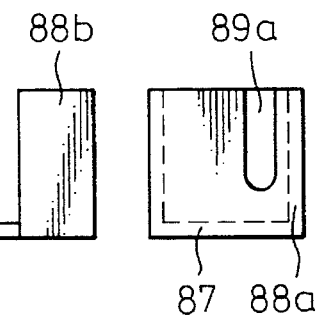
FIG. 15(C) is an explanatory side view of the side containers of FIGS. 15(A) and 15(B)

Referring to FIGS. 15(A), 15(B) and 15(C), side containers 65a and 65b are formed from a bottom plate 87 on which the main container 64 of FIGS. 14(A) to (C) is also placed, side walls 88a and 88b and lids (not shown). In the side walls 88a and 88b of the side containers 65a and 65b, apertures or grooves 89a and 89b are formed. The grooves can be closed at upper openings thereof by the lids (not shown).

Referring to FIGS. 16(A) and 16(B), the package structure of the present invention is formed from the main container as shown in FIGS. 14(A) to (C) and the side containers as shown in FIGS. 15(A) to (C). An optical fiber 76a is introduced into the main chamber 66 through the aperture 89a, the side chamber 67a, the connecting groove 86, the side chamber 67b and the sleeve 74b. The other optical fiber 76b is introduced into the main chamber 66 through the aperture 89b, the side chamber 67b, the connecting groove 86, the side chamber 67a and the sleeve 74a.

In an embodiment of the package structure of the present invention, with respect to each sleeve attached to the main container, the center line of the hollow space of the sleeve intersects an axial line of a corresponding terminal of the optical element fixed in the main container. The intersecting angle between the sleeve hollow space center line and the optical element terminal axial line is in the range of from 2 to 5 degrees.

Usually, where an optical fiber having a coating layer covering a core fiber has a diameter of 0.9 mm, the sleeve for the optical fiber has an inside diameter of about 1 mm. The gap between the inside peripheral surface of the sleeve and the optical fiber inserted into the sleeve is sealed by solder. When a core fiber section having a diameter of 0.125 mm of the optical fiber is located in the sleeve and fixed to the sleeve by the solder, the gap between the inside surface of the sleeve and the core fiber section of the optical fiber is preferably made smaller. For this purpose, sometimes, the inside diameter of an end of the sleeve opening to the main chamber is reduced to about 0.6 mm. Usually, the center line of the sleeve is parallel to the axial line of the main container.

For example, in a waveguide type electro-optical element which has potential use as an external modulator for an optical communication system, the connection of the terminal faces of the optical element to the terminal faces of the optical fibers is carried out by using an adhesive having a low refractive index to reduce a reflection of light at the connection. Also in the connection, an inclined incidence system is usually employed.

Where the core fiber section of the optical fiber is introduced into the main chamber through the sleeve having a very small inside diameter, and is connected to the optical element, the core fiber section must be bent so as to impart an inclined incidence angle, for example, 5 to 7 degrees, to the axial line of the terminal of the optical element. This bending sometimes causes the core fiber section to be brought into contact with the edge of the sleeve and to be broken or scratched. Accordingly, this connecting operation is not always easy.

The above-mentioned feature of the package structure effectively allows the core fiber sections of the optical fibers to be connected to the optical element at a desired angle, without damaging the core fiber sections of the optical fibers.

Referring to FIG. 17, a main container 90 has a sleeve 91, and an optical element 97 is fixed on a stand 92 in a main chamber 93. A terminal face 94 of the optical element 97 is inclined at an angle $R_1$ (not shown in FIG. 17), for example, 5 degrees, from a plane 95 crossing at right angles to the axial line 96 of the optical element 97. Also, a terminal face of a glass capillary 98 through which a terminal of an optical fiber is connected to the terminal face 94 of the optical element 97, is inclined at an angle $R_2$, for example, 7 degrees, from a plane crossing at right angles to the center line of the optical fiber inserted into the capillary 98. In this case, the optical fiber can be connected to the optical element at an angle of $R_2$, for example, 7 degrees to the terminal face of the optical element, and at an angle of $R_3=R_2-R_1$, for example, 7−5=2 degrees, to the axial line of the optical element.

A center line 99 of the sleeve 91 intersects the axial line 96 of the optical element 97 at an angle $R_3$, preferably of 2 to 5 degrees.

Referring to FIG. 18, in a main container 100 having a main chamber 101, an optical element 102 is fixed. A pair of sleeves 103a and 103b are attached to a pair of side walls 104a and 104b facing each other. A pair of optical fibers 105a and 105b are introduced into the main chamber 101 through the sleeves 103a and 103b and connected to terminal faces of the optical element 102. The center lines of the sleeves 103a and 103b are inclined to the axial line of the optical element at a small angle $R_3$ as shown in FIG. 17.

In FIG. 19, the sleeve attached to the side wall 104a has a center line 106a inclined at an angle $R_{3a}$ to a horizontal line 107a parallel to an axial line of an optical element (not shown). Also, the sleeve 103b attached to the side wall 104b has a center line 106b inclined at an angle $R_{3b}$ to a horizontal line 107b parallel to the axial line of the optical element (not shown). The angles $R_{3a}$ and $R_{3b}$ are preferably 2 to 5 degrees.

In the above-mentioned connection manner, the core fiber sections of the optical fibers can be connected to the terminals of the optical element at a desired incidence angle without breaking or damaging the core fiber sections.

When a terminal face of a naked core fiber section of an optical fiber is connected to a terminal face of an optical element, usually, a connection-reinforcing device is used. The connection-reinforcing device is a glass block having a V-shaped groove for receiving the naked core fiber section, or a glass capillary having a hollow space for receiving the naked core fiber section.

Figure 20:
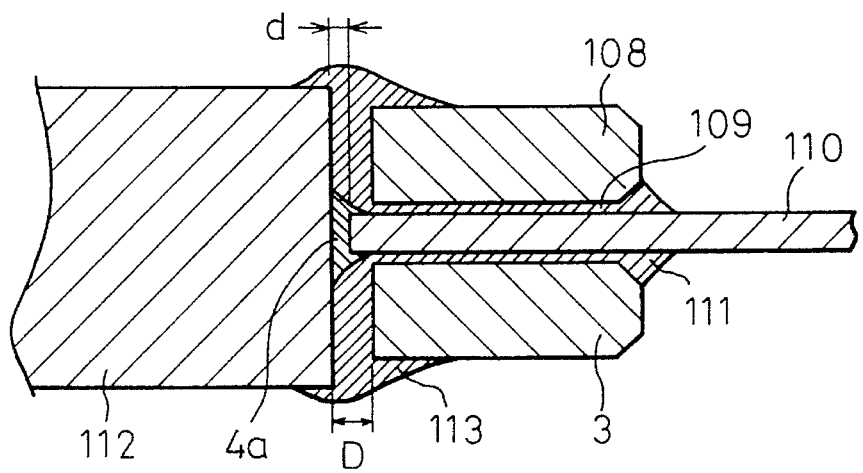
FIG. 20 is an explanatory cross-sectional front view of a conventional connection between an optical fiber and an optical element.

Referring to FIG. 20 showing a conventional connection of an optical element to an optical fiber through a glass capillary, a glass capillary 108 has a hollow space, and a naked core fiber section 110 of an optical fiber is inserted into the hollow space 109. The inserted naked core fiber section 110 is bonded to the glass capillary 108 through an adhesive 111. The glass capillary 108 with the naked core fiber section 110 is bonded to the terminal face of an optical element 112 with a binder 113. In another manner, the naked core fiber section 110 of the optical fiber passes through the capillary 108, the terminal face of the naked core fiber section 110 is connected to the terminal face of the optical element 112 by an adhesive, the terminal face of the capillary 108 is bonded to the terminal face of the optical element 112 by the adhesive, and then the adhesive is injected into the hollow space 109 of the glass capillary 108 so as to fix the naked core fiber section 110 to the inside peripheral surface of the glass capillary 108.

When the connection-reinforcing block having a V-shaped groove is used, a terminal face of the block is bonded to a terminal face of the optical element by an adhesive, the naked core fiber section of the optical fiber is placed in the groove, the terminal face of the naked core fiber section is bonded to the terminal face of the optical element, and the naked core fiber section in the groove is bonded to the block by an adhesive.

In the above-mentioned conventional manners of connecting the optical element to the optical fiber, it is difficult to arrange the terminal face of the capillary on the same plane as that of the terminal face of the optical fiber. In this case, usually, the capillary terminal face is located farther from the terminal face of the optical element than the terminal face of the optical fiber. Namely, as shown in FIG. 20 the distance D between the terminal face of the optical element and the terminal face of the capillary is larger than the distance d between the terminal face of the optical element and the terminal face of the optical fiber. Therefore, the capillary cannot fully protect and reinforce the connection between the optical fiber and the optical element.

Also, it is difficult to arrange the terminal face of the capillary in parallel to the terminal face of the optical fiber and thus the optical fiber inserted into the capillary is inclined to the center line of the hollow space of the capillary. In this case, the capillary cannot fully protect the optical fiber inserted therein, and the connection between the optical element and the optical fiber becomes unstable.

The above-mentioned disadvantages can be removed by the following connection procedures.

Figure 21:
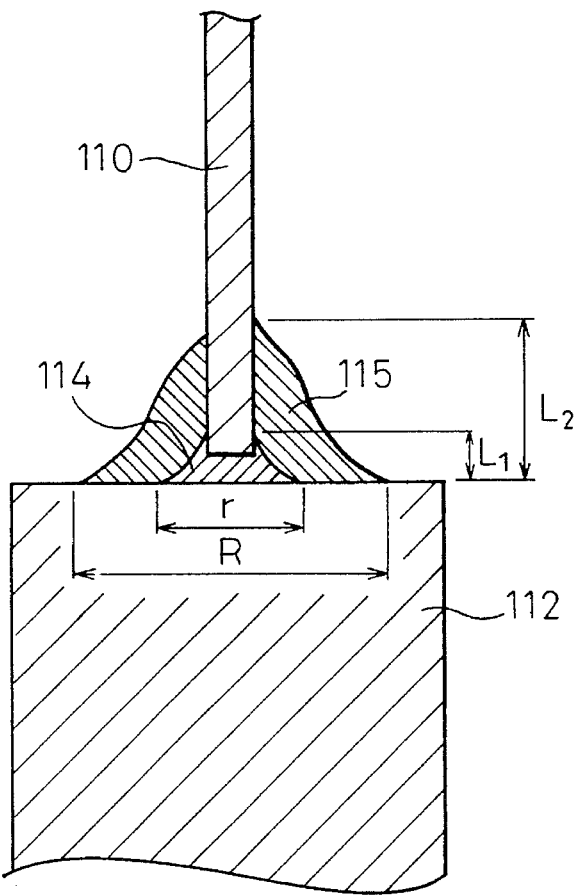
FIG. 21 is an explanatory cross-sectional front view of an embodiment of the improved connection of the present invention between an optical fiber and an optical element.
Figure 22:
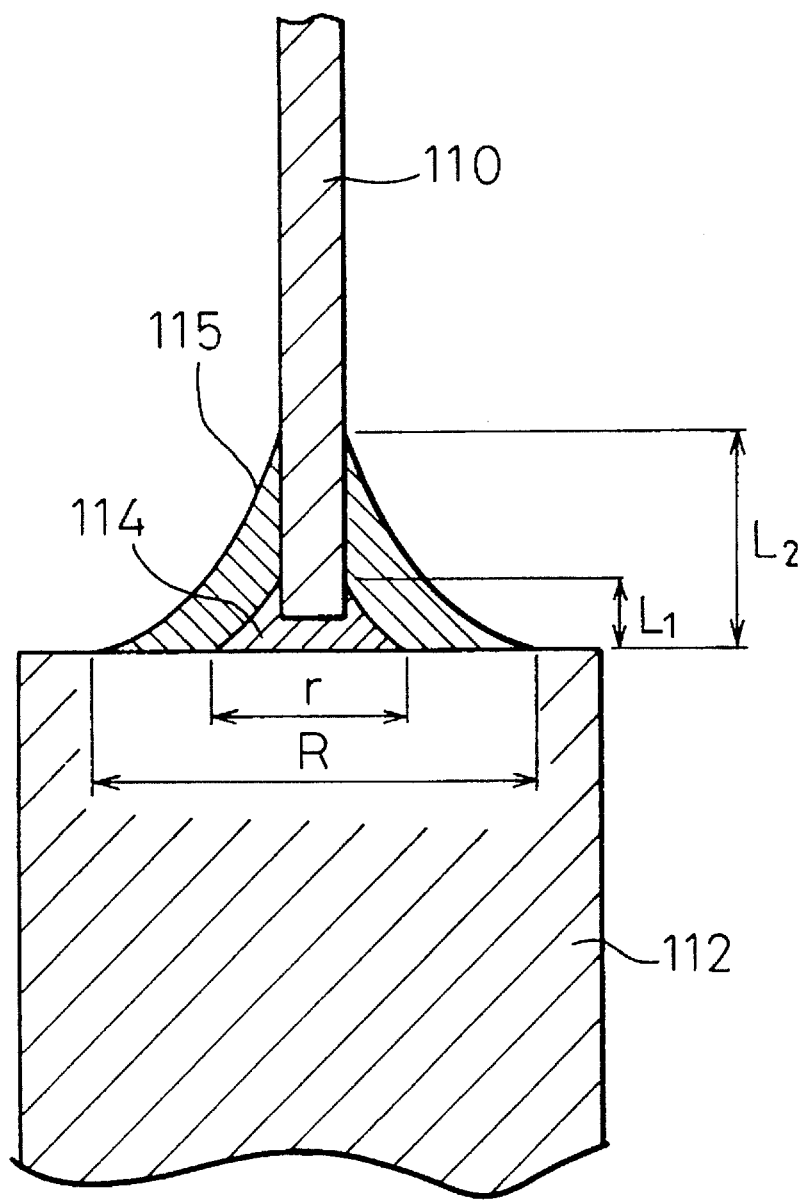
FIG. 22 is an explanatory cross-sectional front view of another embodiment of the improved connection between an optical fiber and an optical element.

Referring to FIGS. 21 and 22, in an end of each optical fiber, a terminal face of a naked core fiber section 110 of the optical fiber is connected to a terminal face of an optical element 112 through a first bonding layer 114 consisting of a resinous adhesive and having a refractive index of 1.4 to 1.6, and the first bonding layer 114 is covered by a second bonding layer 115 consisting of a resinous adhesive and spreading between the peripheral surface of the end portion of the naked core fiber section 110 and the terminal face of the optical element 112.

In the first bonding layer 114, preferably the terminal face of the naked core fiber section 110 of the optical fiber is embedded in a top portion of the first bonding layer 114 and thus peripheral surface of the embedded portion of the naked core fiber section 110 is covered by the first bonding layer 114. Also, the first bonding layer 114 is in the form of a substantial circular cone symmetrical around the axial line of the naked core fiber section 110.

The circular cone-shaped first bonding layer 114 preferably has a diameter r of the bottom face thereof of 130 to 200 µm.

Also, the distance between the terminal face of the optical element 112 and the terminal face of the naked core fiber section 110 is preferably about 50 µm or less. Further, the end portion of the naked core fiber section 110 is preferably embedded at a depth of 5 to 50 µm in the first bonding layer 114 and the first bonding layer preferably has a height $L_1$ of about 50 µm.

The first bonding layer is preferably formed from a resinous adhesive having a relatively low viscosity, for example, an ultraviolet ray irradiation-curable adhesive which is useful for forming a circular cone-shaped or bell-shaped bonding layer.

The first bonding layer exhibits a relatively low bonding strength of 2 to 3 gf.

In a cross-sectional profile of the first bonding layer, the edge line may be a straight line or a curved line projecting outward or inward (FIGS. 21 and 22).

Referring to FIGS. 21 and 22, a resinous adhesive is coated on the first bonding layer 114 to form a second bonding layer 115. Preferably, the second bonding layer 115 is in the form of a circular cone or a bell symmetrical about the axial line of the naked core fiber section 110 of the optical fiber. The second bonding layer 115 preferably has a diameter R of the bottom thereof of 500 to 1000 µm and a height $L_2$ of 100 to 1000 µm.

Due to the formation of the second bonding layer on the first bonding layer, the bonding strength between the optical element and the optical fiber is enhanced to a high level of 100 to 1000 gf. In the cross-sectional profile of the second bonding layer, the edge line is in the form of a straight line or a curved line projecting outward (FIG. 21) or inward (FIG. 22).

The first bonding layer is formed from a resinous adhesive having a refractive index of 1.4 to 1.6, to provide a good optical connection between the optical element and the optical fiber. The resinous adhesive for the first bonding layer may be selected from ultraviolet ray-curable epoxy resins and ultraviolet ray-curable acrylate resins for optical use.

The second bonding layer is formed from the same resinous adhesive as that for the first bonding layer or another resinous adhesive softer than that for the first bonding layer. For example, the soft resinous adhesive for the second bonding layer is selected from silicone resins and polyurethane resins which are capable of preventing an undesirable concentration of stress in the connection between the optical element and the optical fiber.

The connection between a terminal face of an optical element and a terminal face of a naked core fiber section of an optical fiber is reinforced by using a block for supporting the naked core fiber section, or a capillary. The naked core fiber section is inserted into a hollow space of the capillary, and the terminal face of the capillary is connected together with the terminal face of the naked core fiber section to the terminal face of the optical element. This connection of the capillary is optionally further reinforced by using a block bonded to both the capillary and the optical element. When the block is used, the block must be bonded to a bottom surface of the main container, and the naked core fiber section is also connected to the optical element. The bonding of the block sometimes reduces the reliability of the resultant optical device.

Also, if the capillary is used, the arrangement of the capillary which is rigid in the connection between the optical element and the optical fiber sometimes causes a slight movement of the optical fiber due to vibration, impact or cyclical heating applied to the connection.

The above-mentioned disadvantages can be removed in the following manner.

In the main container of the present invention, a first bottom portion on which the optical element is fixed and a pair of second bottom portions located between the optical element and the sleeves are provided. The upper faces of the second bottom portions are higher than the upper face of the first bottom portion and lower than the lower faces of the optical fiber sections located above the second bottom portions. Also, moieties of the optical fiber sections are fixed to the upper faces of the second bottom portions by fixing means.

Preferably, the moieties of the optical fiber sections located above the second bottom portions are moieties of surface-metallized core fiber sections and are fixed to the upper faces of the second bottom portions with solder layers surrounding the moieties of surface-metallized core fiber sections. Alternatively, the moieties of the optical fiber sections located above the second bottom portions are moieties of the naked core fiber sections and are fixed to the upper faces of the second bottom portions with a resinous adhesive layers surrounding the naked core fiber moieties. Preferably, in each second bottom portion, the distance between a connecting terminal face of the optical element and an end of the second bottom portion closest to the optical element is 5 mm or less, measured in parallel to the upper face of the first bottom portion.

Figure 23:
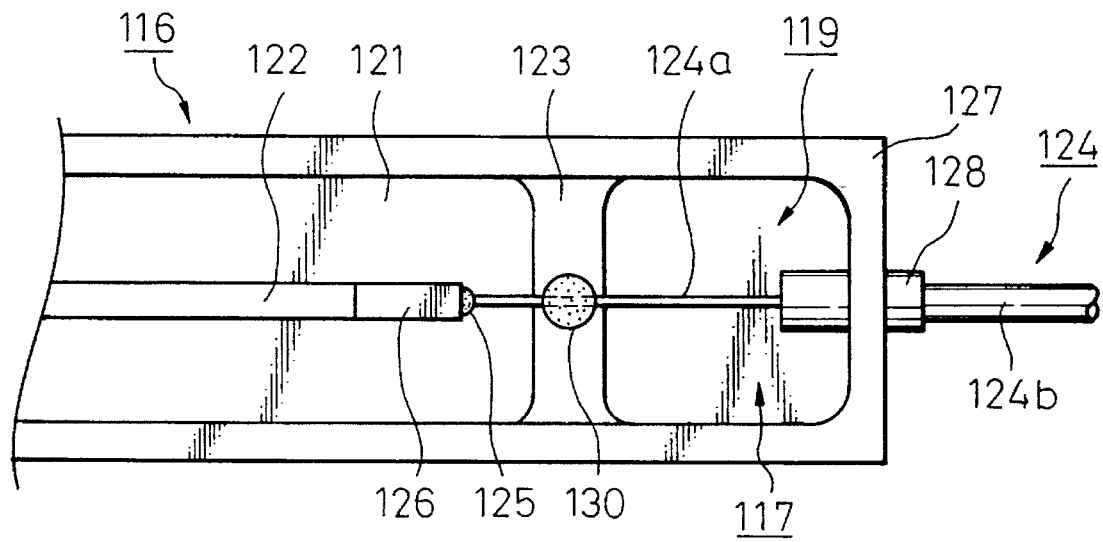
FIG. 23(A) is an explanatory plane view of another embodiment of a right half portion of a main container usable for the present invention, from which a lid member is omitted.
FIG. 23(B) is an explanatory cross-sectional front view of the main container of FIG. 23(A)
Figure 23:
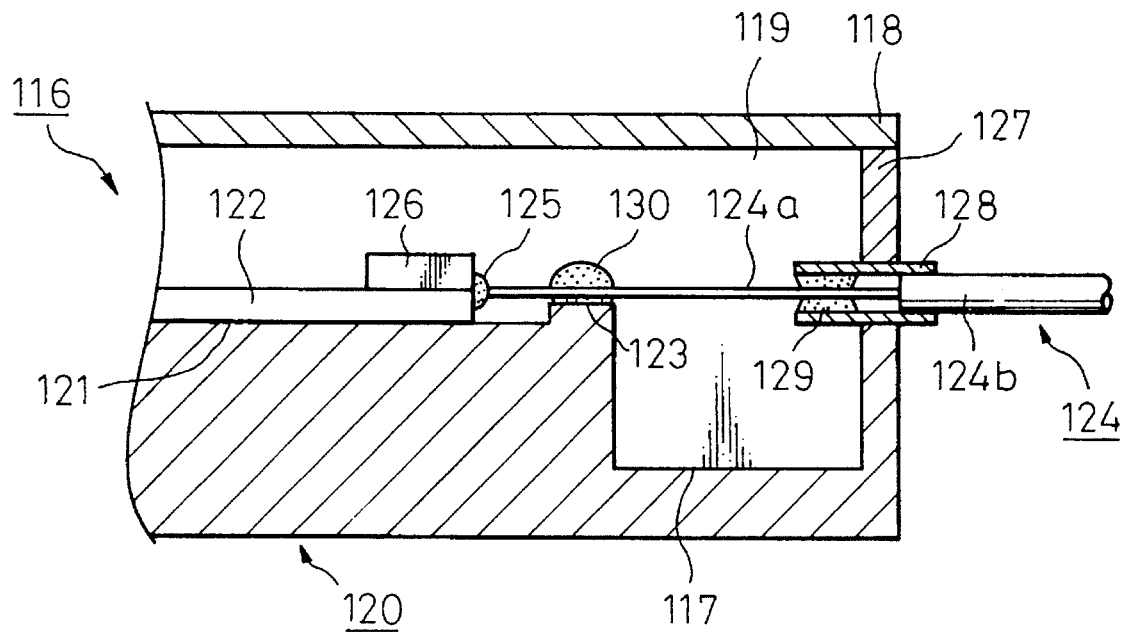

FIGS. 23(A) and 23(B) show a right half portion of a main chamber of the present invention in which an optical fiber is connected to an optical element.

In FIGS. 23(A) and 23(B), a main container 116 is formed from a receptacle member 117 and a lid member 118 and has a main chamber 119. A bottom 120 of the receptacle member 117 has a first bottom portion 121, on which an optical element 122 is fixed, and a second bottom portion 123 facing a passage of an optical fiber 124 connected to the optical element 122.

The second bottom portion 123 has an upper face thereof higher than that of an upper face of the first bottom portion 121. The upper face of the second bottom portion 123 is spaced from a lower face of the passage of the optical fiber 124. Namely, the upper face of the second bottom portion 123 is lower than and spaced from the lower face of the optical fiber passage. A section 124a of the optical fiber 124 located in the main chamber 119 consists of a naked core fiber. A terminal face of the naked core fiber section 124a is connected to a terminal face of the optical element 122, and the connection is reinforced by a connecting adhesive layer 125 and a reinforcing block 126. Usually, the surface of the core fiber section 124a is metallized with gold, nickel or a bi-layer of gold and nickel.

A side wall 127 has an aperture and a sleeve 128 is inserted into the aperture. An end portion of a coating layer coating section 124b of the optical fiber 124 is inserted into a hollow space of the sleeve 128. This section 124b continues to the core fiber section 124a. A moiety of the core fiber section 124a located in the hollow space of the sleeve 128 is fixed to the inside peripheral surface of the sleeve 128 by solder 129. Accordingly, the hollow space of the sleeve 128 is completely sealed by the solder 129.

A moiety of the core fiber section 124a located immediately above the second bottom portion 123 is fixed to the upper face of the second bottom portion 123 by a fixing means 130 surrounding the moiety of the core fiber section 124a. The fixing means 130 may comprise solder or a resinous adhesive.

A portion of the bottom 117 between the side wall 127 and the second bottom portion is not limited to a specific form and dimensions. In FIG. 23(B), this bottom portion is formed lower than the first bottom portion 121. However, this bottom portion may have the same level as that of the first bottom portion 121.

Referring to FIGS. 24(A) and 24(B), a gap S between the upper face of the second bottom portion 123 and the lower face of the core fiber section 124 of the optical fiber, a height H of a center line 131 of the core fiber section 124a from the upper face of the first bottom portion 121, a height h of the second bottom portion upper face from the first bottom portion upper face, and a diameter R of the core fiber section 124a have the following relationship:

$$S = H - h - R/2$$

To avoid that the core fiber section being brought into contact with the second bottom portion and damaged, S is preferably adjusted to a level of 100 µm or more. Also, H is preferably almost equal to the thickness of the optical element, and R is usually 125 µm. When the values of S, H and R are established, it is easy to establish the value of h.

In FIG. 24(A), a distance L between the terminal face of the optical element 122 and an end of the second bottom portion 123 closest to the optical element 122 is established so that the connecting operation of the terminal face of the optical element 122 to the terminal face of the core fiber section 124a of the optical fiber can be easily carried out, the optical element 122 can be easily fixed to the first bottom portion, and the soldering operation of the core fiber section to the second bottom portion can be carried out while preventing an undesirable influence on the optical element-optical fiber connection. Preferably, the distance L is 5 mm or less, more preferably 2 to 5 mm. Usually, the main container is made from a metal material, for example, a brass, stainless steel or a Kovar steel, and the core fiber is made from quartz. The difference in thermal expansion between the metal materials and quartz is in the order of $10^{-5}/°C$.

If the optical element structure is used in an environment in which a change in temperature is about 100° C., the distance L is preferably 5 mm or less to restrict the change in length of the core fiber section to a level of several µm.

Figure 25:
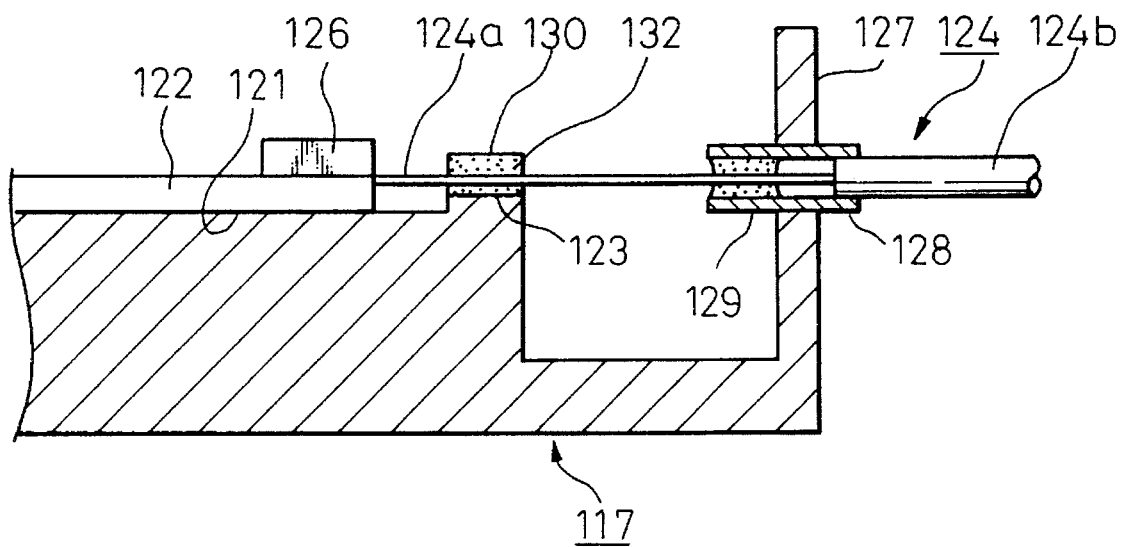
FIG. 25(A) is an explanatory cross-sectional view of a portion of a main container usable for the present invention.
FIG. 25(B) is an explanatory over view of a portion of the main container of FIG. 25(A)
Figure 25:
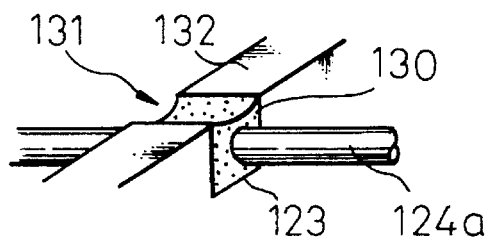

Referring to FIGS. 25(A) and 25(B), the second bottom portion 123 is formed by a bottom face of a groove 131 of a projection 132. The core fiber section 124a of the optical fiber passes across the groove 131 and is fixed to the groove 131 by fixing means 130. In this case, the amount of the fixing means 130 applied to the core fiber section 124a of the optical fiber can be easily controlled by the groove 131 having a known depth, width and length.

Figure 26:
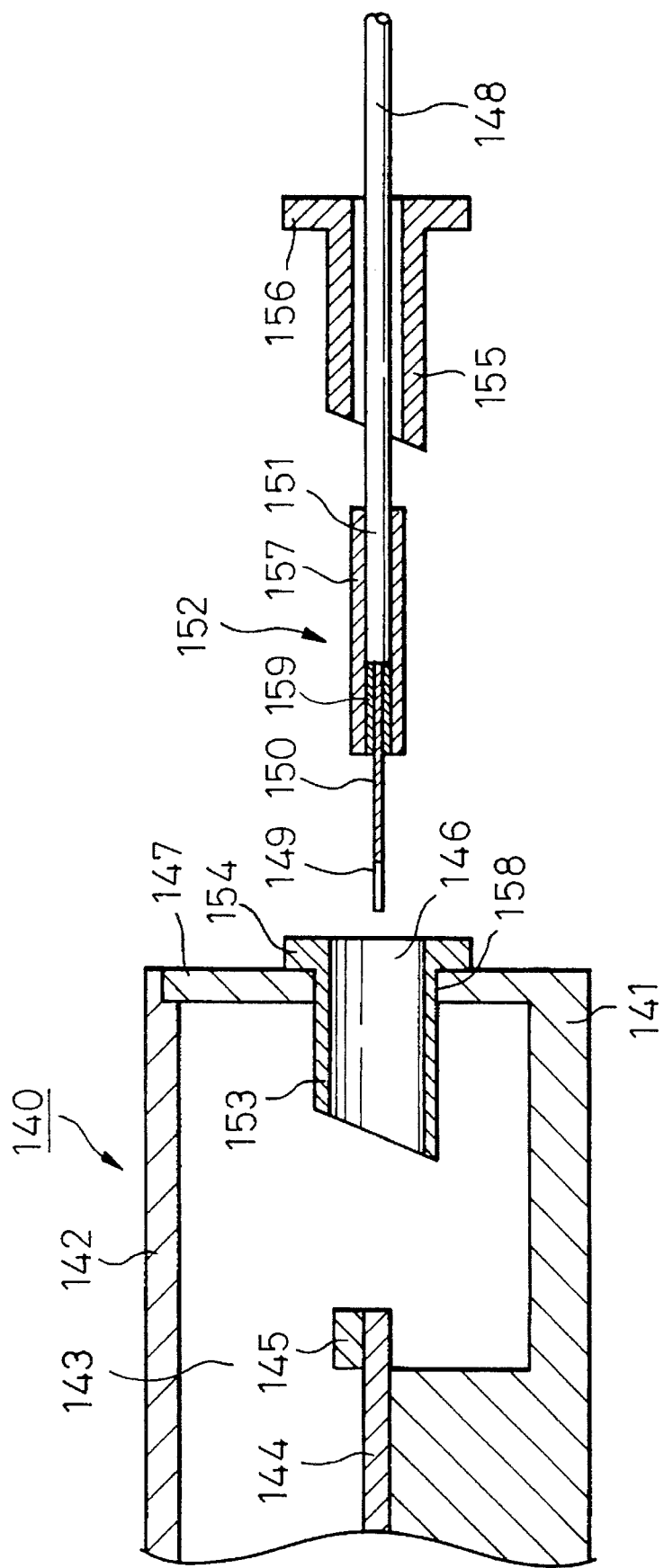
FIG. 26 is an explanatory cross-sectional front view of another embodiment of the main chamber and a composite sleeve usable for the package structure of the present invention.

In an embodiment of the package structure of the present invention, each sleeve comprises an outer tube extending through and fixed to the side wall of the main container, an intermediate tube inserted into the outer tube and an inner tube inserted into the intermediate tube and having a hollow space allowing the optical fiber to be inserted thereinto and connected to the main chamber of the main container. This type of sleeve is contributory to making the total length of the package structure shorter. Also, the sleeve effectively shortens the length of a portion of the optical fiber located in the main chamber of the package structure. In FIG. 26, a main container 140 is composed of a receptacle member 141 and a lid member 142 and is provided with a main chamber 143. An optical element 144 is fixed together with a connection-reinforcing block 145 on a bottom of the receptacle member 141.

An aperture 146 is formed in a side wall 147 of the receptacle member 141.

An end portion of an optical fiber 148 comprises a naked core fiber section 149, a surface-metallized core fiber section 150 and a coating fiber-coated section 151.

A sleeve 152 is composed of an outer tube 153 having an annular projection 154, an intermediate tube 155 having an annular projection 156, and an inner tube 157.

The outer tube 153 is inserted into the aperture 146 and gas-hermetically bonded at the annular projection 154 to the side wall 147 of the main container 140 with an adhesive or solder 158.

The end portion of the optical fiber 148 is passed through the intermediate tube 155 and then through the inner tube 157, and a moiety of the coating layer-coated section 151 and a moiety of the surface-metallized core fiber section 150 continued to the moiety of the section 151 is located in the hollow space of the inner tube 157. An adhesive material 159 is applied into the hollow spaces of the inner tube 157 to fix the moiety of the surface-metallized core fiber section 150 to the inner tube 157.

The inside diameter of the outer tube 153 is established so that the end portion of the optical fiber 148 can be easily introduced into the main chamber 143, the optical axis of the optical fiber can be aligned with the optical axis of the optical element 144, and a terminal face of the optical fiber can be connected to a terminal face of the optical element. For this purpose, the inside diameter of the outer tube 153 is preferably larger than the outside diameter of the inner tube 157.

The naked core fiber section 149 of the optical fiber 148 is introduced into the main chamber 143 through the outside tube 153, the terminal moiety of the naked core fiber section 149 is position-adjusted so that the optical axis of the terminal moiety of the naked core fiber section 149 can be aligned with the optical axis of the terminal portion of the optical element 144, and a terminal face of the naked core fiber section 149 can be connected to a terminal face of the optical element 144. The connection is fixed and reinforced by the reinforcing block 145. The inner tube 157 is located in the hollow space of the outer tube 153. The intermediate tube 155 is inserted and fixed between the outer tube 153 and the inner tube 157. The end opening of the outside tube 153 located in the main chamber 143 is sealed with solder. Also, portions of the outer, intermediate and inner tubes located outside of the main container 140 are completely sealed with an adhesive.

Figure 27:
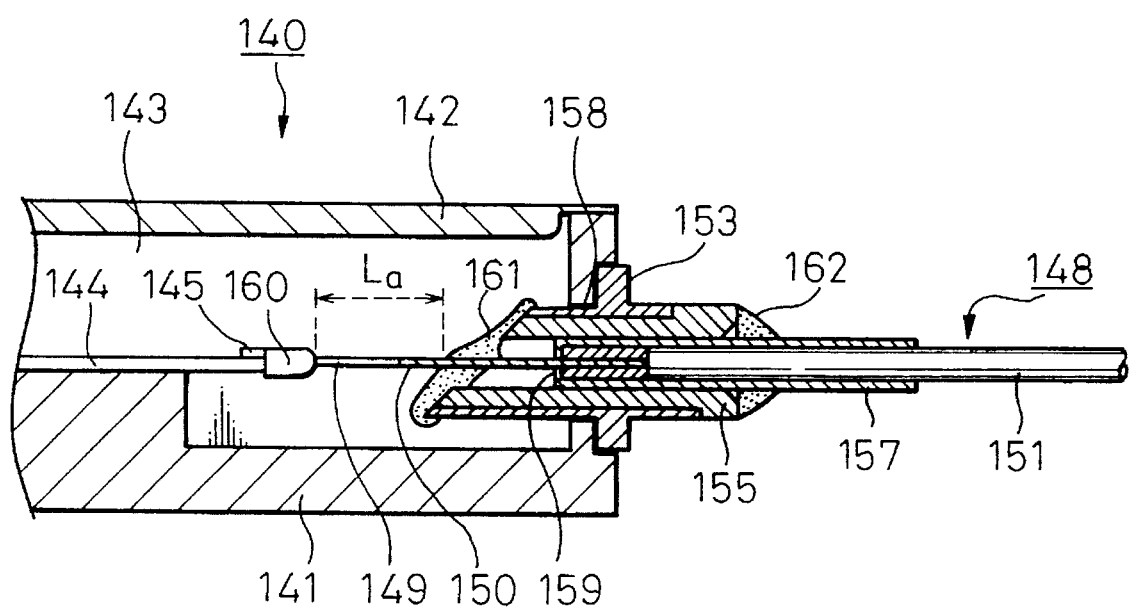
FIG. 27 is an explanatory cross-sectional front view of another embodiment of the main chamber and another composite sleeve usable for the package structure of the present invention.

In FIG. 27, the connection of the optical fiber 148 and the optical element 144 is reinforced by a reinforcing device, for example, glass capillary 160 together with the reinforcing block 145. The open end of the outer tube 153 located in the main chamber 143 is sealed by a solder layer 161 through which a moiety of the surface-metallized core fiber section 150 extends and a connection of the inner tube 157 and the intermediate tube 155 is sealed by an adhesive layer 162.

In the assembly as shown in FIG. 27, the distance $L_a$ between the connection between the optical element and the optical fiber and the solder layer 161 can be relatively short, for example, 2 to 10 mm. Accordingly, this short distance $L_a$ advantageously makes the alignment of the optical axis of the optical element with that of the optical fiber easy.

Figure 28:
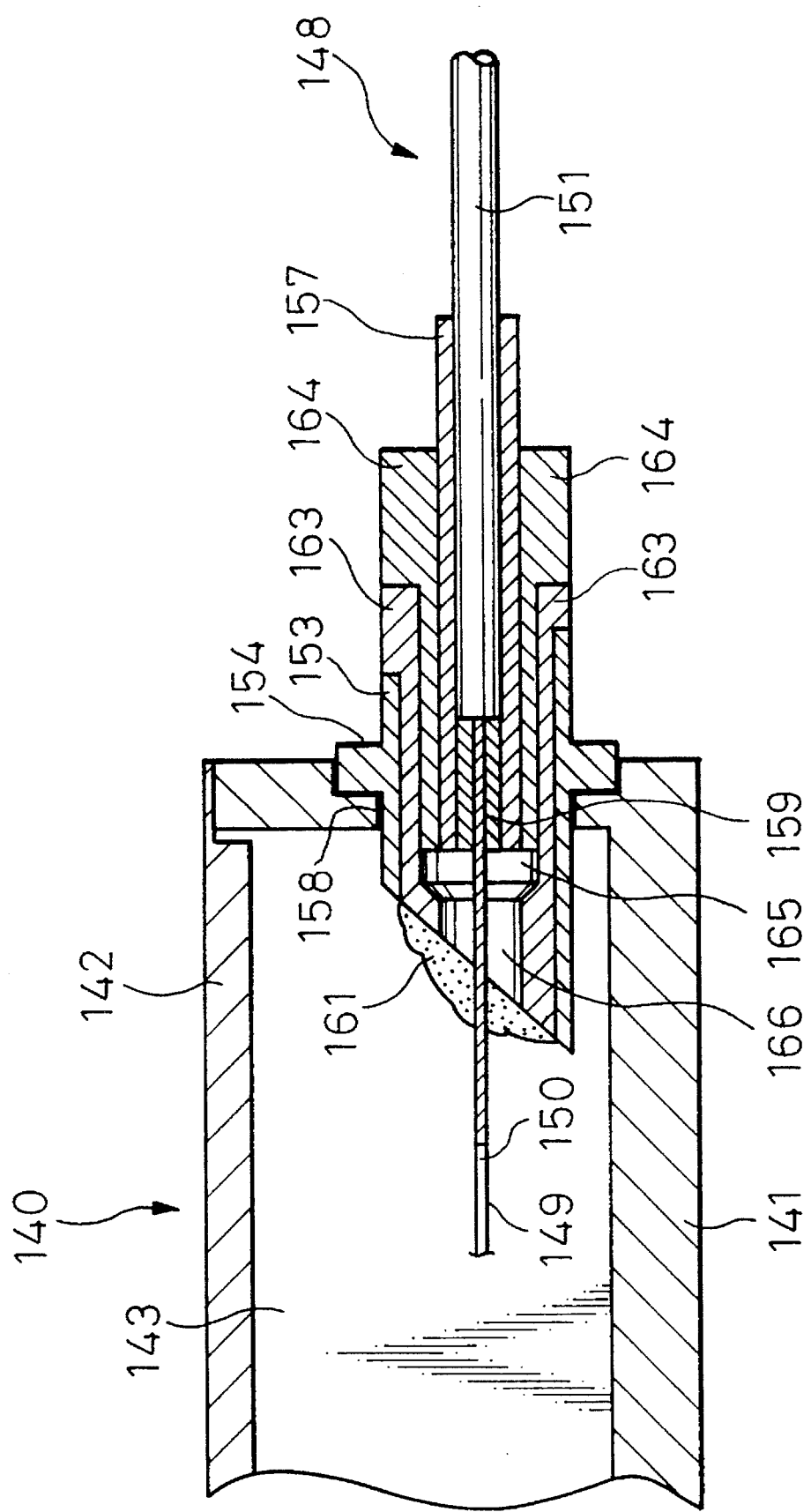
FIG. 28 is an explanatory cross-sectional front view of another embodiment of the main container and another composite sleeve usable for the container structure of the present invention.

In FIG. 28, the intermediate tube of the sleeve is composed of an outside intermediate tube 163 and an inside intermediate tube 164. The outside intermediate tube 163 has a hollow space including a portion 165 thereof suitable for receiving the inside intermediate tube 164 and another portion 166 having a smaller diameter than that of the above-mentioned portion 165 and opening to the main chamber 143. The outside intermediate tube 163 is advantageous in that during the connecting operation of the optical fiber to the optical element, the inside tube 157 including the optical fiber 148 is restricted to excessively move toward the optical element. The outside intermediate tube 163 and the outside tube 154 are gas-hermetically fixed to each other with an adhesive. The gap between the outside intermediate tube 163 and the inner tube 157 is sealed by inserting the inside intermediate tube 164 thereinto and gas-hermetically fixing them with an adhesive. Therefore, in this type of composite sleeve, the adhesive layer 162 shown in FIG. 27 can be omitted.

We claim:

1. A package structure for housing an optical element and gas-hermetically sealing optical fibers connected to the optical element, comprising:

a main container provided with a main chamber for housing an optical element therein;

a pair of side containers attached to the main container and provided with a pair of side chambers formed therein and separated from the main chamber through a pair of side walls, and having a pair of apertures through which the side chambers are connected to the outside of the side chambers; and a pair of sleeves extending from or across the side walls and provided with a pair of hollow spaces through which the main chamber is connected to the side chambers;

a center line of the aperture of each side chamber intersecting a center line of the hollow space of the corresponding sleeve; and a pair of optical fibers in a gradually curved form are introduced into the main chamber of the main container through said apertures and side chambers of the side containers and said hollow spaces of the sleeves, to connect the optical fibers to the optical element.

2. The package structure as claimed in claim 1, wherein the sleeves extend from the side walls only in opposite directions with respect to the main container.

3. The package structure as claimed in claim 1, wherein the side containers are in the form of cylinders surrounding the sleeves.

4. The package structure as claimed in claim 1, wherein in each side container, a center line of the aperture thereof and a center line of the hollow space of the corresponding sleeve are laid on a straight line.

5. The package structure as claimed in claim 1, wherein an intersecting angle between the aperture center line and the hollow space center line is 90 degrees or less.

6. The package structure as claimed in claim 1, wherein the side chambers of the side containers are connected to each other through a connecting passage arranged outside of the main container, said connecting passage allowing the pair of optical fibers to be introduced from one of the side chambers to the other one of the side chambers therethrough.

7. The package structure as claimed in claim 6, wherein the connecting passage is formed in an enclosure connected to the outside surface of the main container.

8. The package structure as claimed in claim 6, wherein the connecting passage is in the form of at least one groove formed on an outside surface portion of the main container.

9. The package structure as claimed in claim 1, wherein with respect to each sleeve, the center line of the hollow space of the sleeve intersects an axial line of a corresponding terminal of the optical element placed in the main chamber.

10. The package structure as claimed in claim 9, wherein an intersecting angle between the sleeve hollow space center line and the optical element terminal axial line is in the range of from 2 to 5 degrees.

11. The package structure as claimed in claim 1, wherein the main container has a first bottom portion for fixing the optical element thereon and a pair of second bottom portions located between the first bottom portion and the sleeves and facing the optical fiber passage, and the upper faces of the second bottom portions are higher than the upper face of the first bottom portion and lower than the lower face of the optical fiber passage.

12. The package structure as claimed in claim 11, wherein the second bottom portions are in the form of grooves.

13. The package structure as claimed in claim 1, wherein each sleeve comprises an outer tube extending through and fixed to the side wall, an intermediate tube inserted into the outer tube and an inner tube inserted into the intermediate tube and having a hollow space allowing the optical fiber to be inserted thereinto.

14. A composite structure of an optical element and optical fibers housed and gas-hermetically sealed in the package structure as claimed in claim 1, wherein an optical element is housed in the main chamber; end portions of optical fibers which comprise secondary coat sections thereof composed of core fibers and primary and secondary coatings, primary coat sections thereof continued from the secondary coat sections and composed of core fibers and primary coatings, surface-metallized core fiber sections thereof continued from the primary coat sections and composed of surface-metallized core fibers, and naked core fiber sections thereof continued from the surface-metallized core fiber sections and composed of naked core fibers, are introduced into the main chamber through the apertures and side chambers of the side containers and the hollow spaces of the sleeves; the terminal faces of the naked core fiber sections are connected to the terminal faces of the optical element; moieties of the surface-metallized core fiber sections located in the hollow spaces of the sleeves are fixed to the sleeves through moisture-nonpermeable bonding material layers formed in gaps between the surface-metallized core fiber moieties and the inside peripheral surfaces of the sleeves; and moieties of the secondary coat sections located in the apertures of the side containers are fixed to the side containers.

15. The optical element-optical fiber composite structure as claimed in claim 14, wherein the sleeves extend from the side walls only in opposite directions to the main containers, and the surface-metallized core fiber moieties are fixed to the sleeves through solder layers injected into the hollow spaces of the sleeves.

16. The optical element-optical fiber composite structure as claimed in claim 14, wherein the side chambers are in the form of cylinders attached to the main container and gaps formed between inside peripheral surfaces of the cylindrical side containers and moieties of the secondary coat sections of the optical fibers located in the side chambers of the cylindrical side containers are sealed by a bonding material.

17. The optical element-optical fiber composite structure as claimed in claim 16, wherein the side chambers of the cylindrical side containers are filled with a filler.

18. The optical element-optical fiber composite structure as claimed in claim 14, wherein the sleeves extend from the side walls into the side chambers, gaps between the moieties of the surface-metallized core fiber sections located in the sleeves and the inside peripheral surfaces of the sleeves are sealed with a moisture-nonpermeable bonding material, and the side chambers are filled with a filler.

19. The optical element-optical fiber composite structure as claimed in claim 14, wherein in each side chamber, a center line of the aperture thereof intersects a center line of the hollow space of the corresponding sleeve, and the primary coat section of the optical fiber is located in the side chamber and curved between the aperture of the side container and the corresponding sleeve.

20. The optical element-optical fiber composite structure as claimed in claim 14, wherein the side chambers of the side containers are connected to each other through a connecting passage arranged outside of the main container, and the optical fibers are introduced from one of the side chambers to the other one of the side chambers through the connecting passage.

21. The optical element-optical fiber composite structure as claimed in claim 14, wherein center lines of the sleeve hollow spaces intersect axial lines of the optical element, and the naked core fiber sections of the optical fibers are connected to the optical element at inclined angles from the axial lines of the optical element.

22. The optical element-optical fiber composite structure as claimed in claim 14, wherein in an end of each optical element, a terminal face of the naked core fiber section is connected to a terminal face of the optical element through a first bonding layer consisting of a resinous adhesive and having a refractive index of 1.4 to 1.6, and the first bonding layer is covered by a second bonding layer consisting of a resinous adhesive and spreading between the peripheral surface of the end portion of the naked core fiber section and the terminal face of the optical element.

23. The optical element-optical fiber composite structure as claimed in claim 22, wherein the bonding material for the first bonding layer is the same as the bonding material for the second bonding layer.

24. The optical element-optical fiber composite structure as claimed in claim 22, wherein the bonding material for the second bonding layer is softer than the bonding material for the first bonding layer.

25. The optical element-optical fiber composite structure as claimed in claim 14, wherein the main container has a first bottom portion on which the optical element is fixed and a pair of second bottom portions located between the optical element and the sleeves, the upper faces of the second bottom portions are higher than the upper face of the first bottom portion and lower than the lower faces of the optical fiber sections located above the second bottom portions, and moieties of the optical fiber sections are fixed to the upper faces of the second bottom portions with fixing means.

26. The optical element-optical fiber composite structure as claimed in claim 25, wherein the moieties of the optical fiber sections located above the second bottom portions are moieties of surface-metallized core fiber sections and are fixed to the upper faces of the second bottom portions with solder layers surrounding the moieties of the surface-metallized core fiber sections.

27. The optical element-optical fiber composite structure as claimed in claim 25, wherein the moieties of the optical fiber sections located above the second bottom portions are moieties of the naked core fiber sections and are fixed to the upper faces of the second bottom portions with resinous adhesive layers surrounding the naked core fiber moieties.

28. The optical element-optical fiber composite structure as claimed in claim 25, wherein in each second bottom portion, the distance between a connecting terminal face of the optical element and an end of the second bottom portion closest to the optical element is 5 mm or less, measured in parallel to the upper face of the first bottom portion.

29. The optical element-optical fiber composite structure as claimed in claim 14, wherein each sleeve comprises an outer tube extending through and fixed to the side wall, an intermediate tube inserted into the outer tube and an inner tube inserted into the intermediate tube, and having a hollow space allowing the optical fiber to be inserted thereinto and connected to the main chamber of the main container, a moiety of the primary coat section and a moiety of the surface-metallized core fiber section continuing to the primary coat section moiety of the optical fiber are located in the inner tube and the surface-metallized core fiber section moiety is fixed to the inside peripheral surface of the inner tube through a resinous bonding material layer, and the open end of the sleeve, through which another moiety of the surface-metallized core fiber section extends into the main chamber, is sealed with a solder layer.

\* \* \* \* \*